(12) United States Patent
Kozaki

(10) Patent No.: US 10,408,262 B2
(45) Date of Patent: Sep. 10, 2019

(54) MAGNET BEARING DEVICE AND ROTOR ROTARY-DRIVE APPARATUS

(71) Applicant: Shimadzu Corporation, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 107 days.

(21) Appl. No.: 15/234,538

(22) Filed: Aug. 11, 2016

(65) Prior Publication Data

US 2017/0110930 A1    Apr. 20, 2017

(30) Foreign Application Priority Data

Oct. 16, 2015  (JP) ................................. 2015-204421

(51) Int. Cl.
*F16C 32/04*  (2006.01)

(52) U.S. Cl.
CPC ...... *F16C 32/0442* (2013.01); *F16C 32/0451* (2013.01); *F16C 32/0493* (2013.01); *F16C 32/0402* (2013.01); *F16C 2360/45* (2013.01); *F16C 2380/26* (2013.01)

(58) Field of Classification Search
CPC .............. F16C 32/0442; F16C 32/0451; F16C 32/0493; F16C 2360/45; F16C 2380/26
USPC ..................... 310/90.5; 417/423.12
See application file for complete search history.

(56) References Cited

U.S. PATENT DOCUMENTS

| | | | |
|---|---|---|---|
| 4,121,143 A | 10/1978 | Habermann et al. | |
| 6,111,333 A * | 8/2000 | Takahashi | F16C 32/0489 310/68 B |
| 7,825,558 B2 * | 11/2010 | Jungmayr | F04D 29/058 310/90.5 |
| 9,065,369 B2 | 6/2015 | Kozaki | |
| 2008/0131288 A1 * | 6/2008 | Kozaki | F04D 19/042 417/32 |

(Continued)

FOREIGN PATENT DOCUMENTS

| | | |
|---|---|---|
| CN | 102410238 A | 4/2012 |
| JP | 52-93852 | 8/1977 |

(Continued)

OTHER PUBLICATIONS

Office Action dated Oct. 22, 2018 for Chinese Patent Application 201610597460.0, with English language translation.

(Continued)

*Primary Examiner* — Julio C. Gonzalez
*Assistant Examiner* — Rashad H Johnson
(74) *Attorney, Agent, or Firm* — Renner, Otto, Boisselle & Sklar, LLP

(57) ABSTRACT

A magnetic bearing device comprises: a magnetic bearing configured to magnetically levitate and support a rotor rotatably driven by a sensor-less motor; a detector configured to detect displacement from a levitation target position of the rotor to output a displacement signal; a signal processor configured to compensate, based on motor rotation information from a motor controller of the sensor-less motor, for the displacement signal to reduce a vibration component of electromagnetic force of the magnetic bearing; and a current controller configured to generate control current of the magnetic bearing based on the displacement signal having been processed in the signal processor.

7 Claims, 14 Drawing Sheets

(56) References Cited

U.S. PATENT DOCUMENTS

| | | | |
|---|---|---|---|
| 2009/0028720 A1* | 1/2009 | Tsunazawa | F04D 19/042 417/32 |
| 2009/0208354 A1* | 8/2009 | Crisi | F04D 19/042 417/423.4 |
| 2013/0121858 A1* | 5/2013 | Sekita | F04D 29/059 417/423.12 |
| 2013/0147296 A1* | 6/2013 | Kozaki | H02K 7/09 310/90.5 |
| 2014/0219841 A1* | 8/2014 | Kozaki | F04D 19/042 417/423.12 |
| 2014/0271237 A1* | 9/2014 | Kozaki | F04D 19/042 417/45 |
| 2015/0050170 A1* | 2/2015 | Kozaki | F16C 32/0489 417/423.12 |
| 2017/0371330 A1* | 12/2017 | Kozaki | G01K 13/08 |
| 2018/0073516 A1* | 3/2018 | Zhu | F04D 29/058 |

FOREIGN PATENT DOCUMENTS

| | | | |
|---|---|---|---|
| JP | H02-1990236018 A | 9/1990 | |
| JP | H07-1995259854 A | 10/1995 | |
| JP | H11-1999257352 A | 9/1999 | |
| JP | 2014093819 A | 5/2014 | |
| JP | 2014180081 A | 9/2014 | |

OTHER PUBLICATIONS

Office Action for corresponding Japanese Patent Application No. 2015-204421, dated Feb. 5, 2019.

* cited by examiner

FIG. 5
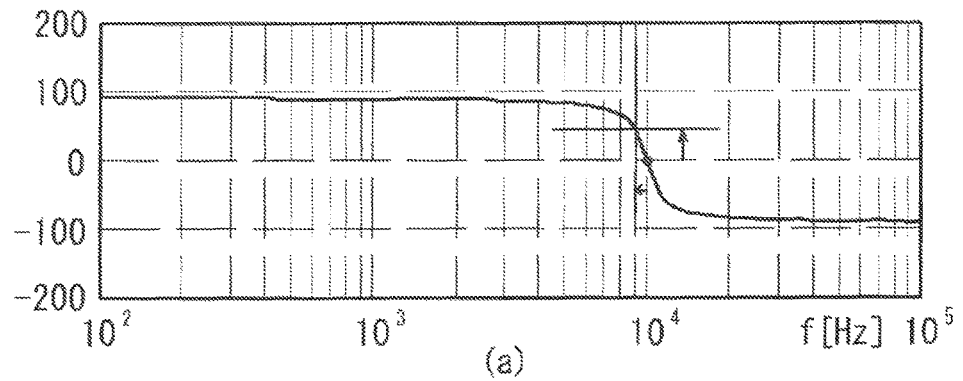
(a)
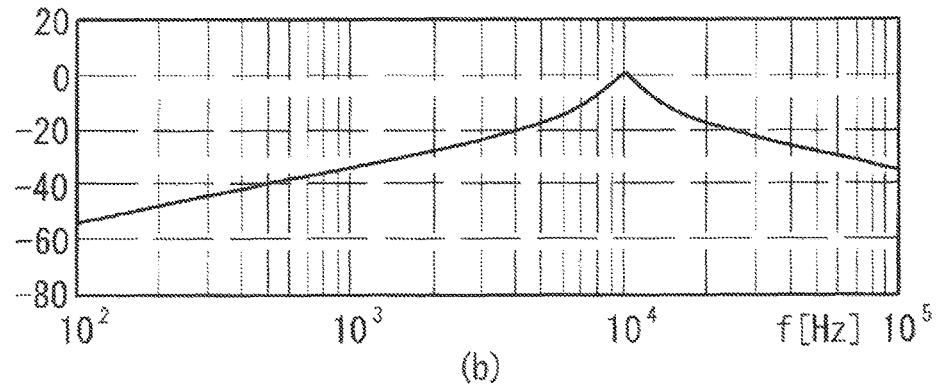
(b)
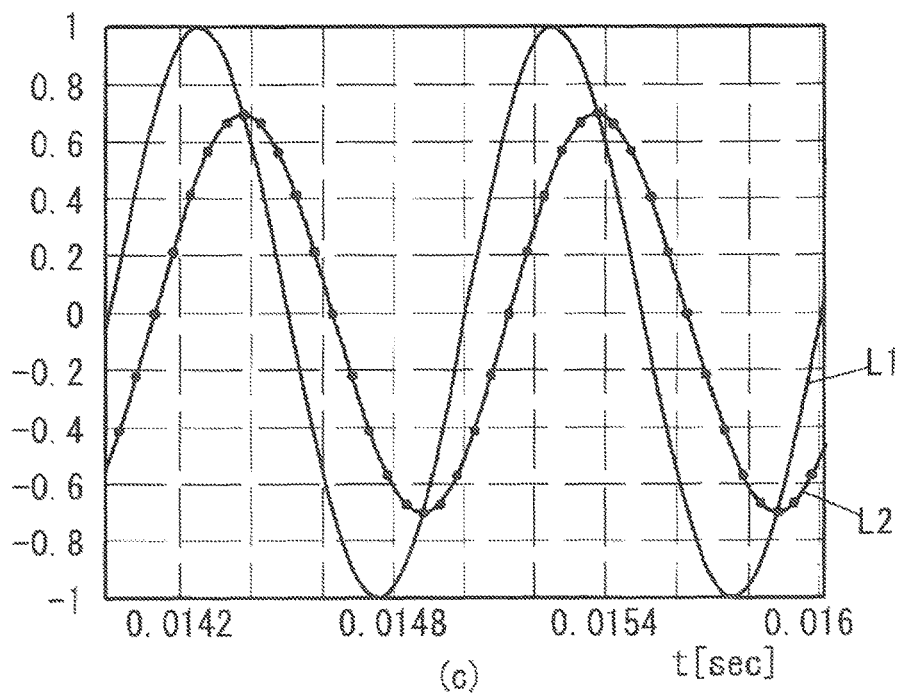
(c)

FIG. 6
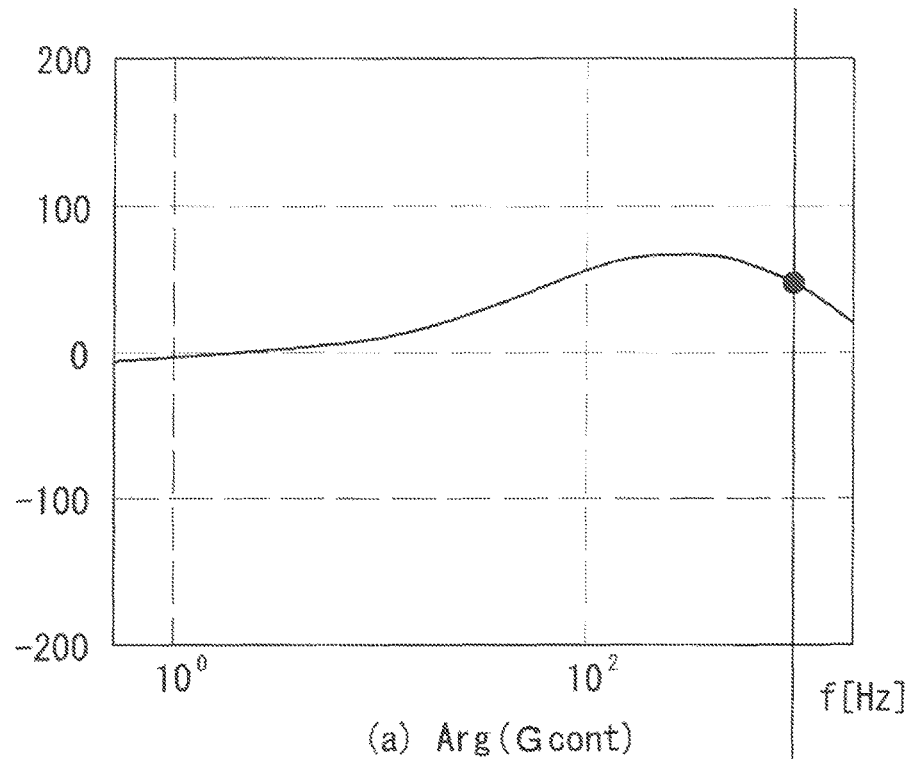
(a) Arg(Gcont)
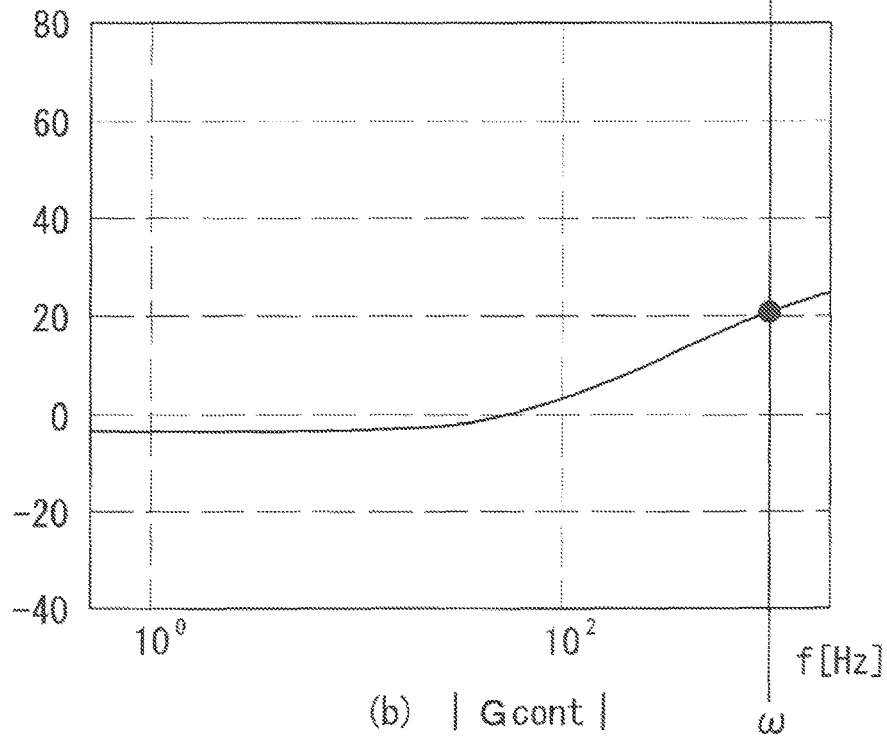
(b) |Gcont|

MAGNET BEARING DEVICE AND ROTOR ROTARY-DRIVE APPARATUS

BACKGROUND OF THE INVENTION

1. Technical Field

The present invention relates to a magnet bearing device and a rotor rotary-drive apparatus including the magnet bearing device.

2. Background Art

With rotor unbalance in a magnetic suspension rotor, vibration with a rotational frequency component is caused due to the rotor unbalance, and then, is transmitted to a stator side by electromagnetic force reaction. Patent Literature 1 describes a magnet bearing control device configured to reduce and compensate for the above-described undesirable vibration caused on the stator side.

In the technique described in Patent Literature 1 (JP-A-52-93852), a rotational speed conversion circuit is provided for generation of a rotation angle ωt, calculation being made based on the rotation angle ωt. Generally, examples of the device configured to generate the rotation angle ωt include a Hall sensor and a magnetic position detector (a resolver). The rotation angle ωt is generated from a pulse signal or a sine wave signal of the magnetic pole position detected by the above-described devices.

As described above, in the technique described in Patent Literature 1, the rotation detection device such as the Hall sensor is required for generation of the rotation angle wt.

SUMMARY OF THE INVENTION

A magnetic bearing device comprises: a magnetic bearing configured to magnetically levitate and support a rotor rotatably driven by a sensor-less motor; a detector configured to detect displacement from a levitation target position of the rotor to output a displacement signal; a signal processor configured to compensate, based on motor rotation information from a motor controller of the sensor-less motor, for the displacement signal to reduce a vibration component of electromagnetic force of the magnetic bearing; and a current controller configured to generate control current of the magnetic bearing based on the displacement signal having been processed in the signal processor.

The signal processor includes a first signal processor configured to generate a signal component cancelling a rotational component of the displacement signal, and a second signal processor configured to generate a signal component generating electromagnetic force canceling electromagnetic force caused due to the rotational component of the displacement.

The second signal processor generates the signal component by correcting, based on the motor rotation information, phase shift caused in the rotational component of the displacement signal after passage through the detector until control current generation by the current controller, and correcting a gain in the current controller.

The current controller includes a magnetic levitation controller configured to generate a current control signal, and an excitation amplifier configured to generate the control current, the magnetic levitation controller generates the current control signal based on a signal obtained by addition of the signal component generated in the first signal processor to the displacement signal, and the excitation amplifier generates the control current based on a signal obtained by addition of the signal component generated in the second signal processor to the current control signal generated in the magnetic levitation controller.

The current controller generates the control current based on a signal obtained by addition of the signal components generated in the first and second processors to the displacement signal.

A rotor rotary-drive apparatus comprises: the magnetic bearing device; a sensor-less motor configured to rotatably drive a rotor magnetically levitated and supported by the magnetic bearing device; a motor controller configured to control the sensor-less motor; and a field programmable gate array circuit, referred to as an FPGA circuit, on which at least the motor controller and the signal processor of the magnetic bearing device are mounted.

According to the present invention, the vibration component of the electromagnetic force is reduced based on the motor rotation information from the motor controller. This can lead to cost reduction.

BRIEF DESCRIPTION OF THE DRAWINGS

FIGS. 5(a) to 5(c) are graphs of an example of phase shift in a sensor signal due to a bandpass filter;

FIGS. 6(a) and 6(b) are graphs of an example of a transfer factor Gcont;

DETAILED DESCRIPTION OF THE EXEMPLARY EMBODIMENTS

Embodiments of the present invention will be described below with reference to drawings.

First Embodiment

Figure 1:
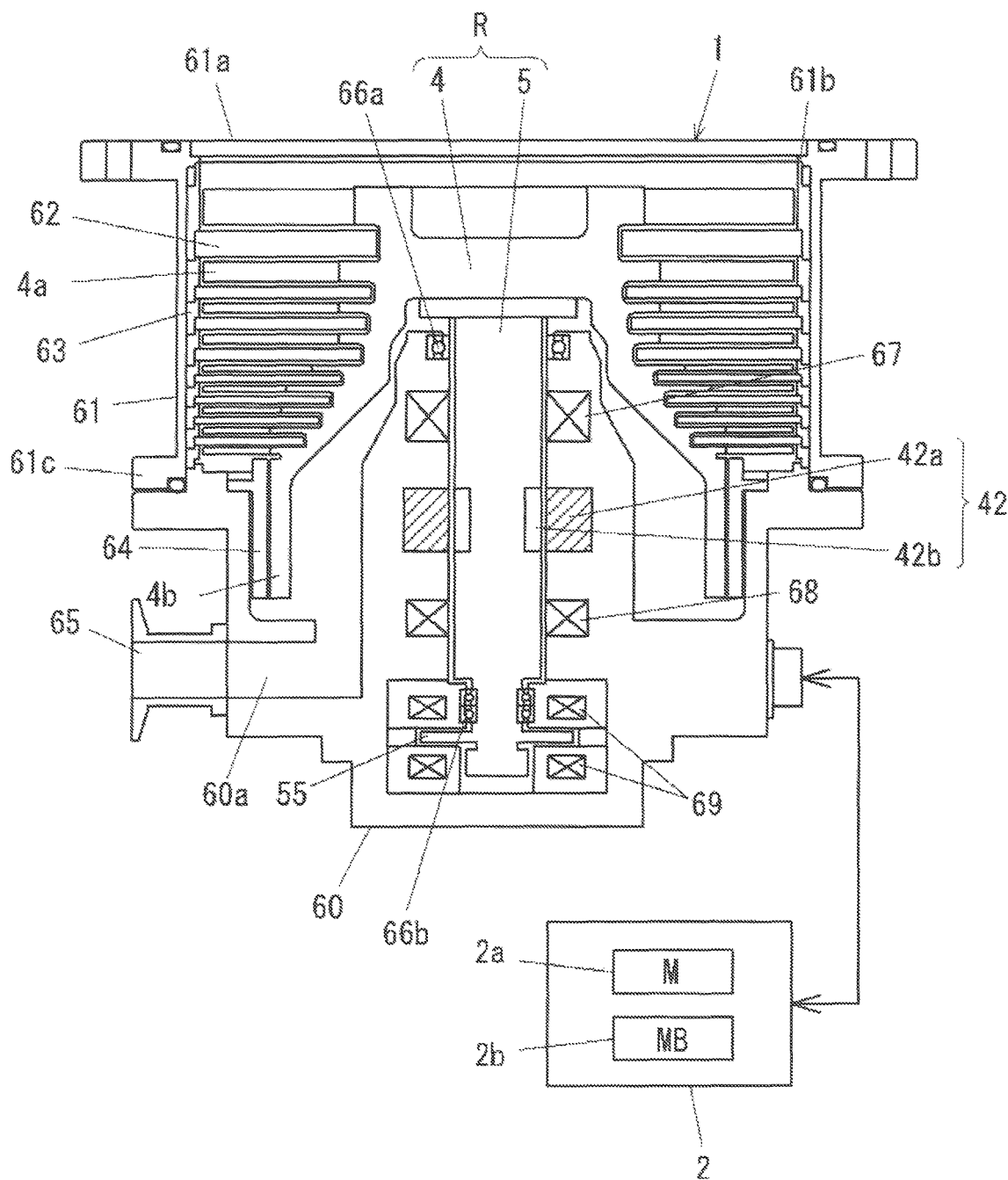
FIG. 1 is a schematic configuration view of a vacuum pump including a magnetic bearing device of an embodiment.

FIG. 1 is a schematic configuration view of a vacuum pump including a magnetic bearing device of the present embodiment. The vacuum pump illustrated in FIG. 1 is a magnetic levitation turbo-molecular pump. Such a vacuum pump includes a pump unit 1 and a control unit 2 configured to drive the pump unit 1. Note that the control unit 2 may be separated from the pump unit 1, or may be integrated with the pump unit 1. The control unit 2 includes a motor drive controller 2a configured to control driving of a motor 42, and a bearing drive controller 2b configured to control driving of magnetic bearings 67, 68, 69. In the turbo-molecular pump of FIG. 1, the magnetic bearing device is formed of the magnetic bearings 67, 68, 69 of the pump unit 1 and the bearing drive controller 2b of the control unit 2.

The pump unit 1 includes a turbo pump stage having rotor blades 4a and stationary blades 62, and a drag pump stage (a screw groove pump) having a cylindrical portion 4b and a screw stator 64. Although a screw groove is formed at the screw stator 64 in the present embodiment, the screw groove may be formed at the cylindrical portion 4b.

The rotor blades 4a and the cylindrical portion 4b are formed at a pump rotor 4. The pump rotor 4 is fastened to a rotor shaft 5. The pump rotor 4 and the rotor shaft 5 form a rotor unit R. The stationary blades 62 and the rotor blades 4a are alternately arranged in an axial direction. Each stationary blade 62 is placed on a base 60 with a spacer ring 63 being interposed between the stationary blade 62 and the base 60. When a fixing flange 61c of a pump casing 61 is fixed to the base 60 with bolts, a stack of the spacer rings 63 is sandwiched between the base 60 and a locking portion 61b of the pump casing 61, and therefore, the position of each stationary blade 62 is determined.

The rotor shaft 5 is, in a non-contact state, supported by the magnetic bearings 67, 68, 69 provided at the base 60. Each magnetic bearing 67, 68, 69 includes electromagnets and a displacement sensor. The levitation position of the rotor shaft 5 is detected by the displacement sensors. Note that the electromagnets forming the axial magnetic bearing 69 are arranged to sandwich, in the axial direction, a rotor disc 55 provided at a lower end of the rotor shaft 5. The rotor shaft 5 is rotatably driven by the motor 42.

The motor 42 is a synchronization motor, and in the present embodiment, a DC brushless motor is used as the motor 42. The motor 42 includes a motor stator 42a disposed at the base 60, and a motor rotor 42b provided at the rotor shaft 5. A permanent magnet is provided at the motor rotor 42b. When the magnetic bearings are not in operation, the rotor shaft 5 is supported by emergency mechanical bearings 66a, 66b.

An exhaust port 65 is provided at an exhaust port 60a of the base 60, and a back pump is connected to the exhaust port 65. While being magnetically levitated, the rotor unit R is rotatably driven at high speed by the motor 42. In this manner, gaseous molecules are exhausted from a suction port 61a toward the exhaust port 65.

Figure 2:
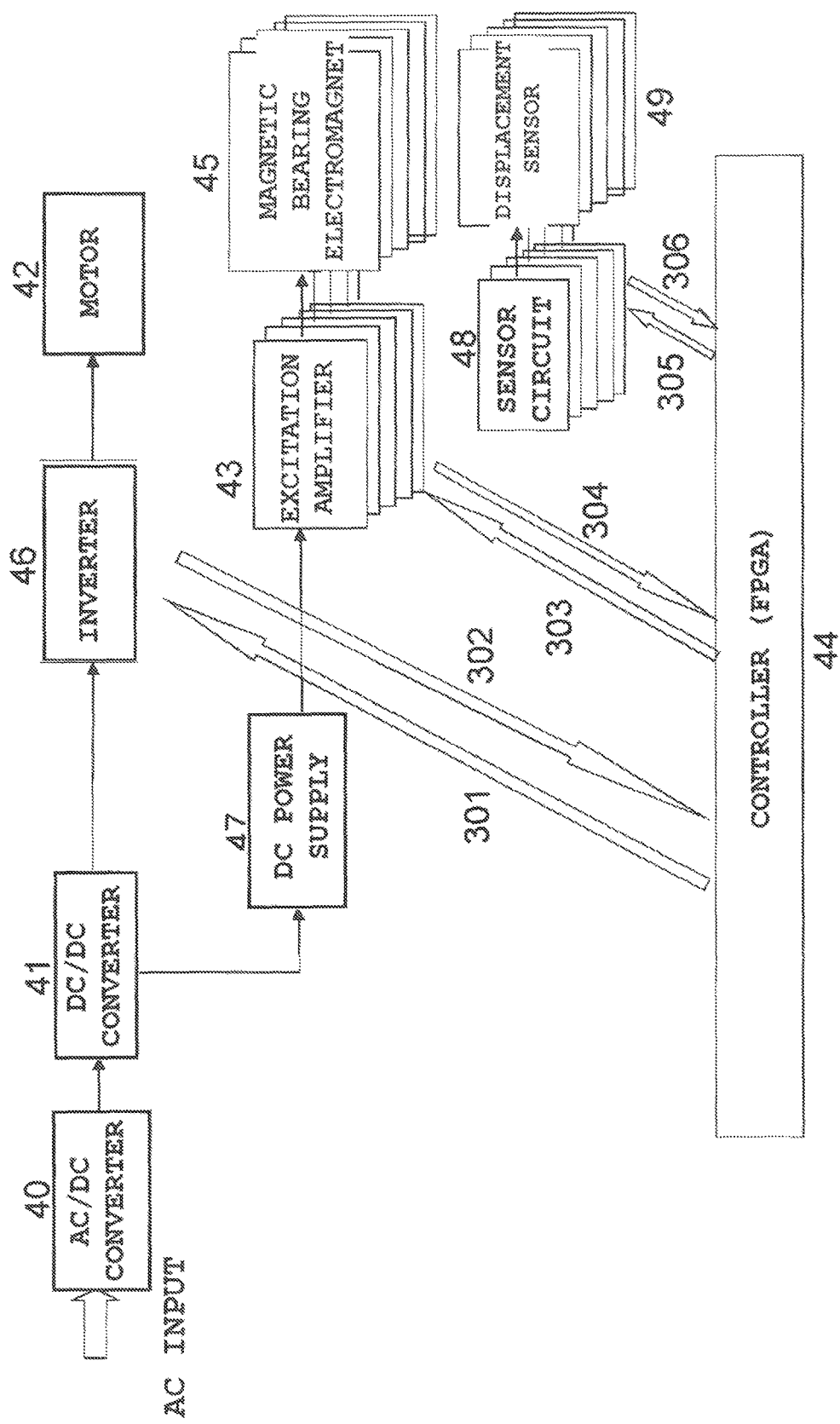
FIG. 2 is a schematic block diagram of a control unit configuration.

FIG. 2 is a schematic block diagram of the configuration of the control unit 2. External AC input is converted into DC output (DC voltage) by an AC/DC converter 40 provided at the control unit 2. The DC voltage output from the AC/DC converter 40 is input to a DC/DC converter 41, and then, DC voltage for the motor 42 and DC voltage for the magnetic bearings are generated by the DC/DC converter 41.

The DC voltage for the motor 42 is input to an inverter 46. The DC voltage for the magnetic bearings is input to a DC power supply 47 for the magnetic bearings. The magnetic bearings 67, 68, 69 form a five-axes magnetic bearing. Each magnetic bearing 67, 68 includes two pairs of magnetic bearing electromagnets 45, and the magnetic bearing 69 includes a pair of magnetic bearing electromagnets 45. Each of ten excitation amplifiers 43 independently supplies current to a corresponding one of the five pairs of magnetic bearing electromagnets 45, i.e., the ten magnetic bearing electromagnets 45.

A controller 44 is a digital calculator configured to control the motor and the magnetic bearings, and in the present embodiment, a field programmable gate array (FPGA) is used as the controller 44. For the inverter 46, the controller 44 outputs a PWM control signal 301 for controlling on/off of a plurality of switching elements included in the inverter 46. For each excitation amplifier 43, the controller 44 outputs a PWM control signal 303 for controlling on/off of a switching element included in the excitation amplifier 43. Moreover, a sensor carrier signal (a carrier signal) 305 is input from the controller 44 to each sensor circuit 48. In addition, a signal 302 indicating the phase voltage and phase current of the motor 42 and an electromagnetic current signal 304 of the magnetic bearings are input to the controller 44. Further, a sensor signal 306 modulated by rotor displacement is input from each sensor circuit 48. The motor drive controller 2a illustrated in FIG. 1 corresponds to a motor control system formed of the inverter 46 and the controller 44. Moreover, the bearing drive controller 2b corresponds to a bearing control system formed of the excitation amplifiers 43, the sensor circuits 48, and the controller 44.

Figure 3:
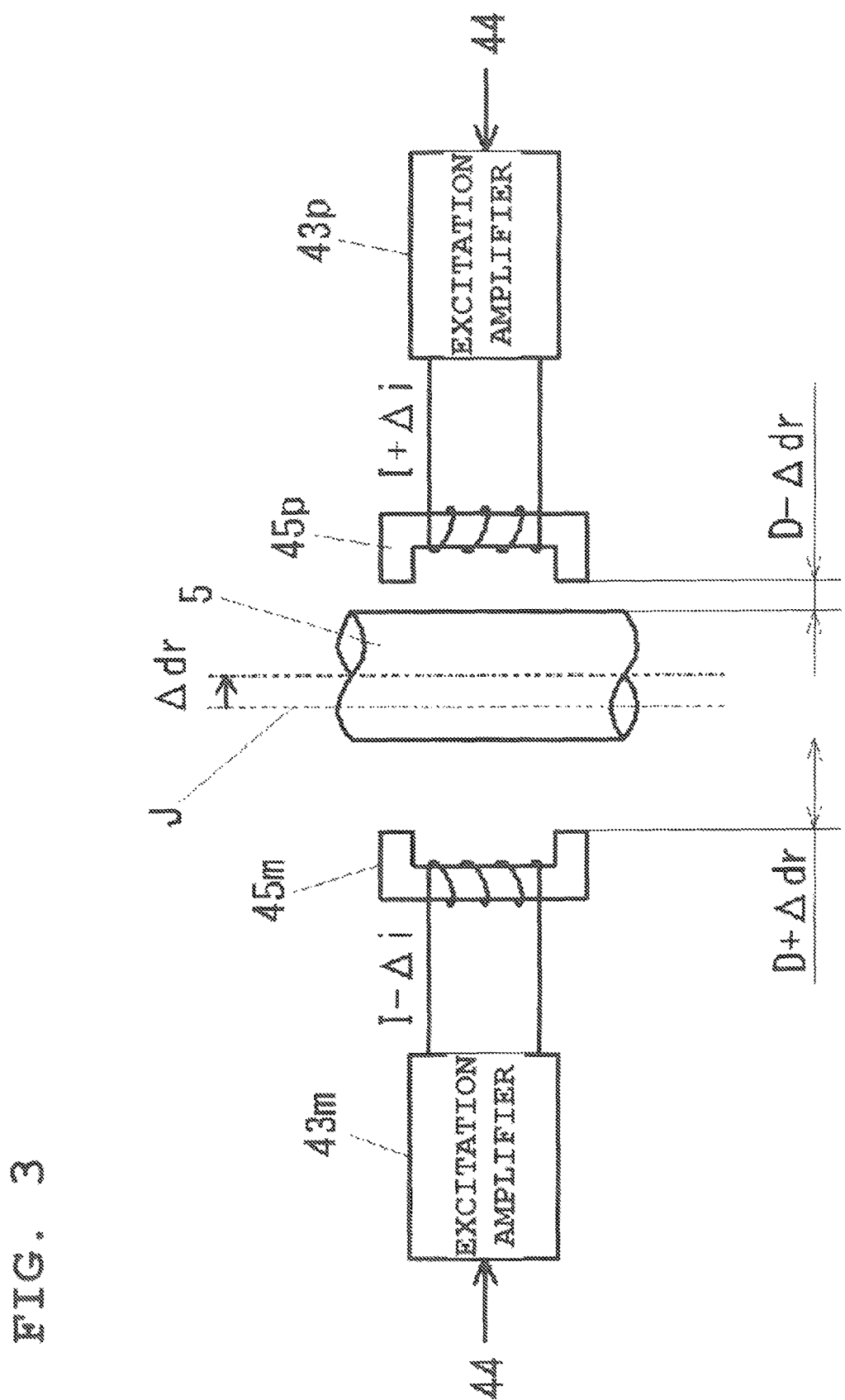
FIG. 3 is a schematic diagram of magnetic bearing electromagnets of each control axis.

FIG. 3 is a schematic diagram of the magnetic bearing electromagnets 45 provided for each control axis at the magnetic bearing 67, 68. The two magnetic bearing electromagnets 45 (45P, 45m) are arranged to face each other and to sandwich a levitation target position J of the rotor shaft 5. As described above, the excitation amplifiers 43p, 43m are provided respectively for the magnetic bearing electromagnets 45P, 45m. In FIG. 3, a displacement Δdr toward the magnetic bearing electromagnet 45P on a P side (the right side as viewed in FIG. 3) is positive displacement. The magnetic bearing electromagnets 45 of which displacement is toward a negative side is referred to as a "M-side magnetic bearing electromagnet 45m." The dimension D is a gap dimension between the magnetic bearing electromagnets 45P, 45m when the rotor shaft 5 is at the levitation target position J.

Figure 4:
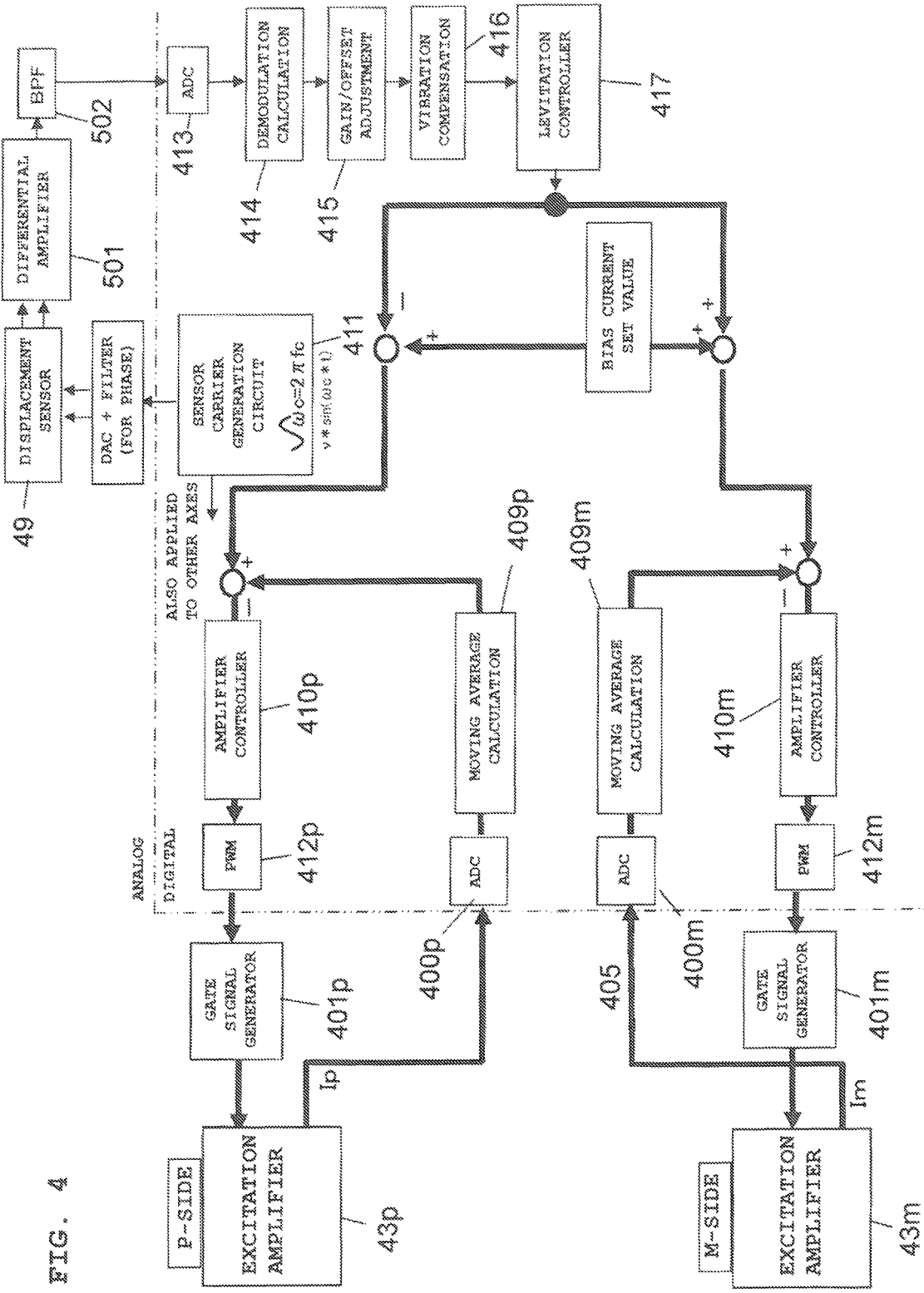
FIG. 4 is a functional block diagram of magnetic bearing control.

FIG. 4 is a functional block diagram of magnetic bearing control in the controller 44, and illustrates one (e.g., the single axis illustrated in FIG. 3) of the five control axes. As illustrated in FIG. 3, the pair (the P-side and the M-side) of magnetic bearing electromagnets 45p, 45m is provided for each control axis. The excitation amplifiers 43 (43p, 43m) are provided respectively for the magnetic bearing electromagnets 45p, 45m. Although not shown in the figure, a current sensor for detecting electromagnetic current is provided at each excitation amplifier 43p, 43m of FIG. 4, and current detection signals Ip, Im are output respectively from the excitation amplifiers 43p, 43m.

A gate signal generator 401p outputs a gate drive signal to the P-side excitation amplifier 43p based on a PWM control signal generated at a PWM calculator 412p. Similarly, a gate signal generator 401m outputs a gate drive signal to the M-side excitation amplifier 43m based on a PWM control signal generated at a PWM calculator 412m.

When on/off of the switching element of each excitation amplifier 43p, 43m is controlled based on the gate drive signal, voltage is applied to an electromagnetic coil of the magnetic bearing electromagnet 45p, 45m, and therefore, the electromagnetic current Ip, Im flows through the magnetic bearing electromagnet 45p, 45m. The current sensor of the P-side excitation amplifier 43p outputs a current detection signal (similarly indicated by reference characters "Ip" as in the electromagnetic current) as a detection result of the electromagnetic current Ip flowing through the P-side magnetic bearing electromagnet 45p. On the other hand, the current sensor of the M-side excitation amplifier 43m outputs a current detection signal (similarly indicated by reference characters "Im" as in the electromagnetic current) indicating the electromagnetic current Im flowing through the M-side magnetic bearing electromagnet 45m.

Each of the current detection signals Ip, Im output from the excitation amplifiers 43p, 43m is taken into a corresponding one of AD converters 400p, 400m. Each of the current detection signals Ip, Im taken into the AD converters 400p, 400m is input to a corresponding one of moving average calculators 409p, 409m. Each moving average calculator 409p, 409m is configured to perform moving average processing for the sampling data taken into a corresponding one of the AD converters 400p, 400m. Accordingly, the information on current components (bias current and levitation control current) contributing to levitation control force is obtained.

After a sensor carrier signal (a digital signal) generated at a sensor carrier generation circuit 411 is converted from the digital signal into an analog signal, the converted signal is applied to a pair of displacement sensors 49 (the displacement sensors provided respectively for the magnetic bearing electromagnets 45p, 45m) via a filter circuit for phase adjustment. A difference between the sensor signals modulated by the displacement sensors 49 is obtained by a differential amplifier 501. After such a differential signal is filtered by a bandpass filter 502, AD sampling is performed for the filtered signal by an AD converter 413.

In a demodulation calculator 414, demodulation calculation is performed based on the sampling data. In a gain/offset adjuster 415, gain adjustment and offset adjustment are performed for the demodulated signal. In a vibration compensator 416, compensation control on vibration caused due to rotor whirling is performed for the signal (the displacement information) output from the gain/offset adjuster 415. Note that vibration compensation control in the vibration compensator 416 will be described in detail later. In a magnetic levitation controller 417, a levitation control current setting is generated by proportional control, integral control, derivative control, phase correction, and other compensation control based on the signal output from the vibration compensator 416. For P-side control, the value obtained by subtracting the levitation control current setting from a bias current set value is used. For M-side control, the value obtained by adding the levitation control current setting to the bias current set value is used.

The calculation result of the moving average calculator 409p described above is subjected to subtraction using the result obtained by subtracting the levitation control current setting from the bias current set value. Such a subtraction result is input to an amplifier controller 410p. The PWM calculator 412p generates the PWM control signal based on the signal generated by the amplifier controller 410p. On the other hand, in M-side control, the calculation result of the moving average calculator 409m is subjected to subtraction using the result obtained by adding the levitation control current setting to the bias current set value. Such a subtraction result is input to an amplifier controller 410m. The PWM calculator 412m generates the PWM control signal based on the signal generated by the amplifier controller 410m.

(Gain and Phase Shift)

As described above, phase shift in a sensor signal xs, ys used for bearing control is caused due to filtering performed by the bandpass filter 502 illustrated in FIG. 4, and in addition, phase shift and gain shift are caused due to the processing performed by the magnetic levitation controller 417. FIGS. 5(a) to 5(c) show an example of phase shift in a sensor signal due to the bandpass filter 502. FIG. 5(a) is a graph showing a phase in association with a frequency, and FIG. 5(b) is a graph showing a gain in association with a frequency.

As shown in FIG. 5(a), a greater frequency difference from the center frequency of the bandpass filter 502 results in greater phase shift. In the example shown in FIGS. 5(a) to 5(c), a sensor carrier frequency is 10 kHz, and a Q-value is set as Q=5. In this case, when the frequency of a displacement signal is 1 kHz, a phase shift of about 40 deg is caused. In addition, a phase shift of about 10 deg is caused in the case of a frequency of 100 Hz, and a phase shift of about 60 deg is caused in the case of a frequency of 2.5 kHz. A greater Q-value results in greater phase shift of a demodulation signal relative to a modulated signal.

FIG. 5(c) is a graph showing an actual displacement (a real signal) Δdr and a displacement (a demodulation signal) Δds based on a sensor signal in the case of a frequency of 1 kHz. A line L1 indicates the real signal Δdr, and a line L2 indicates the displacement Δds. The line L2 is shifted from the line L1 by 40 deg.

FIGS. 6(a) and 6(b) are graphs showing an example of a transfer function Gcont. FIG. 6(a) shows the relationship between a frequency and phase shift, and FIG. 6(b) shows the relationship between a frequency and a gain. Both of the phase shift and the gain vary according to the frequency. A black circle in each of FIGS. 6(a) and 6(b) indicates the phase shift and the gain in the case where the rotational speed of the rotor shaft 5 is ω. As illustrated in FIGS. 5(a) to 5(c), 6(a), and 6(b), the phase and amplitude of the sensor signal are susceptible to the influence of the bandpass filter 502 and the transfer function Gcont. For this reason, compensation control needs to be performed considering reduction and compensation for vibration with a rotational component.

(Reduction and Compensation for Vibration with Rotational Component)

Next, compensation control at the vibration compensator 416 will be described. As illustrated in FIG. 3, a change in the electromagnetic force acting on the rotor shaft 5 in the case where the rotor shaft 5 is displaced from the levitation target position J by Δdr will be considered. This is because of the following reason: the fixed side (i.e., the pump body side) of the magnetic beating receives electromagnetic force reaction, and therefore, when the electromagnetic force acting on the rotor shaft 5 is changed, the pump body side vibrates due to the reaction of such electromagnetic force.

The electromagnetic current of each magnetic bearing electromagnet 45 contains the bias current for ensuring predetermined bearing rigidity, and the control current for controlling the levitation position of the rotor shaft 5. That is, the control current changes according to the levitation position of the rotor shaft 5. For example, in order to displace the rotor shaft 5 toward one of the magnetic bearing electromagnets 45p, 45m, the control current is supplied such that the electromagnetic force of the magnetic bearing electromagnet on the side toward which the rotor shaft 5 is to be displaced is increased and that the electromagnetic force of the magnetic bearing electromagnet on the opposite side is decreased.

As illustrated in FIG. 3, the control current of the magnetic bearing electromagnet 45p is represented by "+Δi," and the control current of the magnetic bearing electromagnet 45m on the opposite side is represented by "−Δi." The gap between the magnetic bearing electromagnet 45p and the rotor shaft 5 is D−Δdr, and the gap between the magnetic bearing electromagnet 45*m* and the rotor shaft 5 is D+Δdr, supposing that a displacement from the levitation target position J is Δdr. At this point, the force Fp of the magnetic bearing electromagnet 45*p* in the right direction as viewed in FIG. 3 and the force Fm of the magnetic bearing electromagnet 45*m* in the left direction as viewed in the FIG. 3 are represented by Expressions (1), (2). In Expressions (1), (2), "D" denotes a gap dimension when the rotor shaft 5 is magnetically levitated to the levitation target position, "I" denotes a bias current flowing through the magnetic bearing electromagnet 45*p*, 45*m*, and "k" denotes a coefficient of the magnetic bearing electromagnet 45*p*, 45*m*.

$$Fp = k((I+\Delta i)/(D-\Delta dr))^2 \quad (1)$$

$$Fm = k((I-\Delta i)/(D+\Delta dr))^2 \quad (2)$$

When a variation ΔFp, ΔFm in the force Fp, Fm is obtained by linear approximation of Expression (1), (2), Expression (3), (4) is obtained as follows:

$$\Delta Fp = (2kI/D^2)\Delta i + (2kI^2/D^3)\Delta dr \quad (3)$$

$$\Delta Fm = (-2kI/D^2)\Delta i + (-2kI^2/D^3)\Delta dr \quad (4)$$

The control current Δi is generated based on the displacement signal Δds generated from the detection results of the displacement sensors 49 (FIG. 4). Using the transfer function Gcont in magnetic levitation control, the relationship between the displacement signal Δds as an input and the control current Δi as an output is represented by Expression (5). That is, when the displacement signal Δds is input to the magnetic levitation controller 417, the control current Δi is supplied to the magnetic bearing electromagnets 45 such that the force of the magnetic bearing electromagnet on the displacement side is decreased and that the force of the magnetic bearing electromagnet on the side opposite to the displacement side is increased.

$$\Delta i = -G cont \cdot \Delta ds \quad (5)$$

Note that in the displacement signal Δds input to the magnetic levitation controller 417, phase shift relative to the detection signal output from each displacement sensor 49 is caused due to filtering performed by the bandpass filter 502. For this reason, the displacement phase represented by the displacement signal Δds is generally different from the actual displacement Δdr.

When a change ΔF (=ΔFp−ΔFm) in the electromagnetic force acting on the rotor shaft 5 is obtained using Expressions (3), (4), (5) described above, Expression (6) is obtained. In Expression (6), the first term including the displacement signal Δds indicates the electromagnetic force generated by the control current Δi. On the other hand, the second term including the actual displacement Δdr indicates the electromagnetic force generated, regardless of control, by shifting of the rotor shaft 5 from the levitation target position due to whirling.

$$\begin{aligned}\Delta F &= \Delta Fp - \Delta Fm \quad (6)\\ &= (4kI/D^2)\Delta i + (4kI^2/D^3)\Delta dr\\ &= (4kI/D^2)(-Gcont)\Delta ds + (4kI^2/D^3)\Delta dr\end{aligned}$$

When the rotor shaft 5 is at an ideal levitation target position, both of Δi and Δdr are zero, and therefore, the change ΔF in the electromagnetic force is also zero. Generally, electromagnetic force with a rotational component is, however, generated due to the external vibration acting on the vacuum pump or the rotor whirling caused by rotor unbalance. For this reason, ΔF is not always ΔF=0. As a result, the fixed side (the pump body side) vibrates due to electromagnetic force reaction.

Even in such a case, the control current Δi is controlled such that the first and second terms of Expression (6) are cancelled each other, and therefore, ΔF (hereinafter referred to as "ΔF(nw)") due to rotor whirling can be ΔF(nw)=0. That is, even with whirling of the rotor shaft 5, the control current Δi is controlled such that ΔF(nw) becomes ΔF(nw)=0, and as a result, vibration of a pump body can be reduced. Thus, in the present embodiment, the vibration compensator 416 is provided as illustrated in FIG. 4, and the control current Δi is controlled such that ΔF(nw) becomes ΔF(nw)=0. In this manner, vibration with the rotational component (the rotational frequency component) due to rotor whirling is reduced and compensated.

In order to reduce and compensate for vibration with the rotational component, the rotational position information of the rotor shaft 5 is required. In the present embodiment, sensor-less control is made for the motor 42 rotating the rotor shaft 5, and the electrical angle θ and the rotational speed ω generated in the sensor-less motor control are used as the rotational position information of the rotor shaft 5. With such a configuration, vibration compensation can be more accurately performed at low cost.

Figure 7:
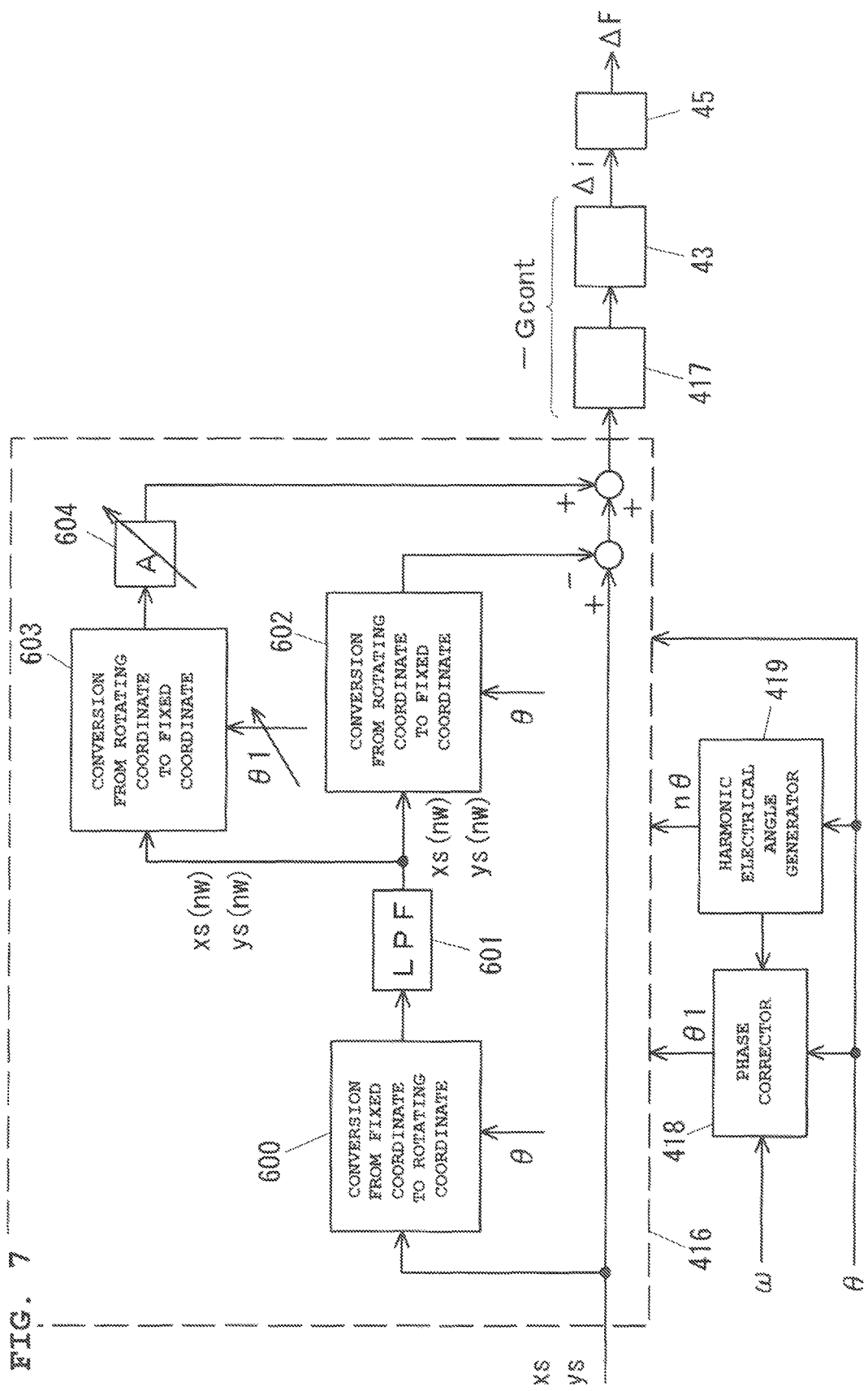
FIG. 7 is a block diagram of a main section in reduction compensation control of vibration with a rotational component.

FIG. 7 is a block diagram of a main section in reduction compensation control of vibration with the rotational component. Note that the above-described transfer function Gcont indicates a transfer function for a combination of the magnetic levitation controller 417 and the excitation amplifiers 43. The signal xs, ys from the displacement sensors 49 is input to the vibration compensator 416. In the vibration compensator 416, the following types of processing are performed for the input sensor signal xs, ys: the processing (hereinafter referred to as "first compensation processing") of subtracting the signal processed in a first conversion processor 600, a low-pass filter 601, and a second conversion processor 602 from the input sensor signal xs, ys; and the processing (hereinafter referred to as "second compensation processing") of adding the signal processed in the first conversion processor 600, the low-pass filter 601, a third conversion processor 603, and a compensator 604 to the sensor signal xs, ys.

In typical control not performing the first compensation processing and the second compensation processing, the sensor signal xs, ys is input to the magnetic levitation controller 417 as they are, and the change ΔF in the electromagnetic force as shown in association with the rotational component in Expression (6) acts on the rotor shaft 5. When Δds, Δdr are represented as Δds (nw), Δdr (nw) associated with the rotational component, Expression (6) is represented as in Expression (7). In Expression (7), "nw" denotes an n-th harmonic.

$$\Delta F(nw) = (4kI/D^2)(-Gcont(nw))\Delta ds(nw) + (4kI^2/D^3)\Delta dr(nw) \quad (7)$$

In Expression (7), the term including Δds(nw) represents the electromagnetic force controllable by the control current Δi. The compensation processing is performed for the sensor signal xs, ys in the vibration compensator 416 such that for the purpose of obtaining ΔF(nw)=0, Δds(nw) determining the control current Δi is to be Δds(nw)→"Δds(nw)−Δds (nw)+AΔds'(nw)." In such an expression of "Δds(nw)−Δds (nw)+AΔds'(nw)," "−Δds(nw)" corresponds to the first compensation processing, and "+AΔds'(nw)" corresponds to the second compensation processing.

The post-compensation change ΔF'(nw) in the electromagnetic force generated based on the signal output from the vibration compensator 416 is represented by Expression (8). Moreover, AΔds'(nw) corresponding to the second compensation processing is set such that the first term "$(4kI/D^2)(-G_{cont}(nw))\{A\Delta ds'(nw)\}$" and the second term "$(4kI^2/D^3)\Delta dr(nw)$" in Expression (8) are cancelled each other.

$$\Delta F'(nw) = (4kI/D^2)(-Gcont(nw))\{\Delta ds(nw) - \Delta ds(nw) + A\Delta ds'(nw)\} + \quad (8)$$
$$(4kI^2/D^3)\Delta dr(nw)$$
$$= (4kI/D^2)(-Gcont(nw))\{A\Delta ds'(nw)\} + (4kI^2/D^3)\Delta dr(nw)$$

As illustrated in FIG. 7, the branched sensor signal xs, ys is, in the first conversion processor 600, converted from a signal in a fixed coordinate system into a signal in a rotating coordinate system rotating at the electrical angle θ. The electrical angle θ is the angle indicating the magnetic pole position of the motor 42, and is input from the motor drive controller 2a (FIG. 1). The electrical angle θ will be described in detail later. Next, in the low-pass filter 601, low-pass filtering is performed for the signal output from the first conversion processor 600, and a frequency component other than the rotational component is removed.

In the magnetic levitation control, the sensor signal xs, ys input to the first conversion processor 600 contains a signal other than the rotational component, and for this reason, low-pass filtering is required to remove the signal other than the rotational component right after the conversion processing. Conversion from the fixed coordinate system into the rotating coordinate system is a type of oversampling signal processing on the premise of quasi-stationary response. For this reason, even if the low-pass filter 601 configured to remove a high-frequency AC component other than the rotational component is provided, a delay effect is less exhibited.

In the second conversion processor 602, the signal subjected to low-pass filtering is converted from the rotating coordinate system into the fixed coordinate system, and as a result, the signal only with the rotational component of the sensor signal xs, ys is generated. Then, the signal output from the second conversion processor 602 and containing only the rotational component is subtracted from the sensor signal xs, ys. That is, the first compensation processing cancels the rotational component contained in the sensor signal xs, ys.

For example, when an output with an error of not exceeding 1 deg is obtained at a single rotation cycle T in calculation in the second conversion processor 602, a short sampling cycle of equal to or less than T/360 is required. A dual high-frequency requires a sampling cycle of equal to or less than T/720, and a higher-order frequency results in a shorter required sampling cycle.

On the other hand, the second compensation processing is for canceling a change in electromagnetic force depending on the actual displacement Δdr due to whirling as described above, i.e., the second term on the right in the Expression (7). In the third conversion processor 603 of FIG. 7, each signal xs(nw), ys(nw) input from the low-pass filter 601 is converted from the rotating coordinate system into the fixed coordinate system.

In the sensor signal xs, ys, phase shift is caused due to the influence of the bandpass filter 502 as described above. Moreover, in the processing by the magnetic levitation controller 417 and the excitation amplifiers 43, gain shift and phase shift are caused according to the transfer function Gcont. For this reason, in order to cancel a change in electromagnetic force due to the displacement Δdr by the second compensation processing, phase shift is corrected using the electrical angle θ1 corrected in conversion by the third conversion processor 603, and gain correction is performed in the compensator 604.

As described above, Δds'(nw) denotes a displacement indicated by a corrected signal. For such a displacement Δds'(nw), phase shift due to the bandpass filter 502 and the transfer function Gcont is corrected. Thus, the control current Δi generated by the displacement Δds'(nw) has the phase opposite to that of the actual displacement Δdr. Thus, in conversion by the third conversion processor 603, the conversion processing is performed using the corrected electrical angle θ1 obtained by correcting the electrical angle θ output from the motor drive controller 2a by the above-described phase shift. The corrected electrical angle θ1 will be described later.

In the compensator 604, the amplitude of each signal xs(nw), ys(nw) is corrected using a correction factor A. The correction factor A is for correcting gain shift due to the transfer function Gcont(nw) such that the magnitude of electromagnetic force by a displacement AΔds'(nw) becomes equal to the magnitude of electromagnetic force by the displacement Δdr. Theoretically, A is represented by A=−(I/D)/Gcont (nw). Since conversion is performed using the corrected electrical angle θ1 in the third conversion processor 603, the control current Δi generated by the displacement Δds'(nw) has the phase opposite to that of the displacement Δdr. Thus, the electromagnetic force by the displacement Δdr is canceled by the electromagnetic force by the displacement AΔds'(nw).

Note that when n=1 in the first compensation processing and the second compensation processing for each signal xs(nw), ys(nw), the electrical angle θ input from the motor drive controller 2a is used as it is, but nθ is used in the case of a harmonic with n≥1. As described above, phase shift due to the bandpass filter 502 and the transfer function Gcont (nw) varies according to a frequency, and for this reason, phase shift associated with a frequency is employed as phase shift in correction of the electrical angle nθ. Moreover, the correction factor A depends on the gain of the transfer function Gcont(nw). However, the gain of the transfer function Gcont(nw) also varies according to a frequency, and for this reason, the correction factor A is set according to a frequency.

(Generation of Electrical Angle θ and Rotational Speed ω)

Figure 8:
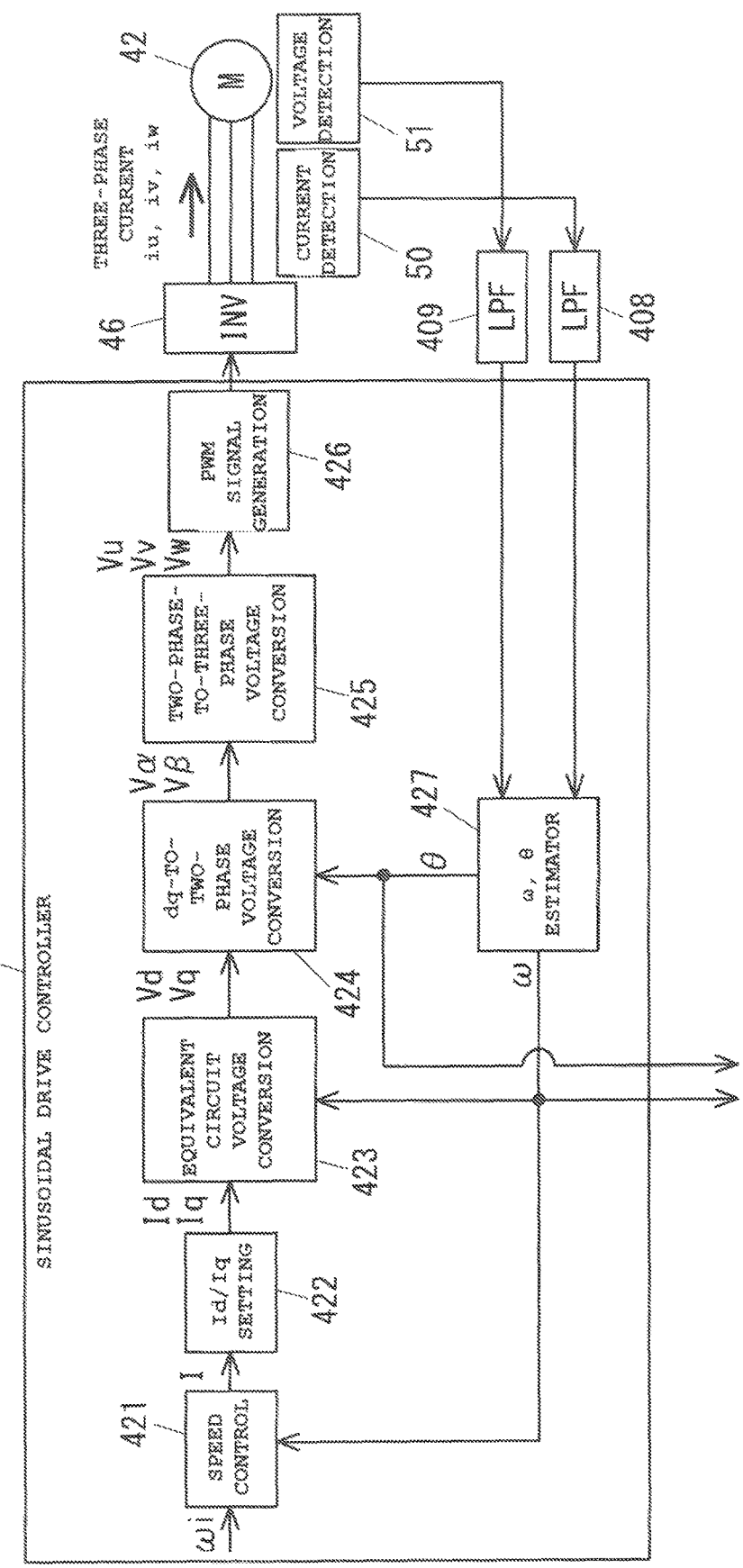
FIG. 8 is a block diagram of a main configuration in sensor-less motor control.

Next, generation of the electrical angle θ in the motor drive controller 2a will be described. FIG. 8 is a block diagram of a main configuration in sensor-less motor control. The motor 42 is driven by the inverter 46. The inverter 46 is controlled by a control signal from a sinusoidal drive controller 420. The sinusoidal drive controller 420 is formed of the above-described FPGA.

The three-phase current flowing through the motor 42 is detected by a current detector 50, and the detected current detection signal is input to a low-pass filter 408. Meanwhile, the three-phase voltage of the motor 42 is detected by a voltage detector 51, and the detected voltage detection signal is input to a low-pass filter 409. The current detection signal having passed through the low-pass filter 408 and the voltage detection signal having passed through the low-pass filter 409 are input to a rotational speed/magnetic pole position estimator 427 of the sinusoidal drive controller 420. Although details will be described later, the rotational speed/ magnetic pole position estimator 427 is configured to estimate the rotational speed ω of the motor 42 and the electrical angle θ as the magnetic pole position based on the current detection signal and the voltage detection signal. The calculated rotational speed ω is input to a speed controller 421 and an equivalent circuit voltage converter 423. Moreover, the calculated electrical angle θ is input to a dq-to-two-phase voltage converter 424. Moreover, the electrical angle θ and the rotational speed ω are also input to the bearing drive controller 2b.

Figure 9:
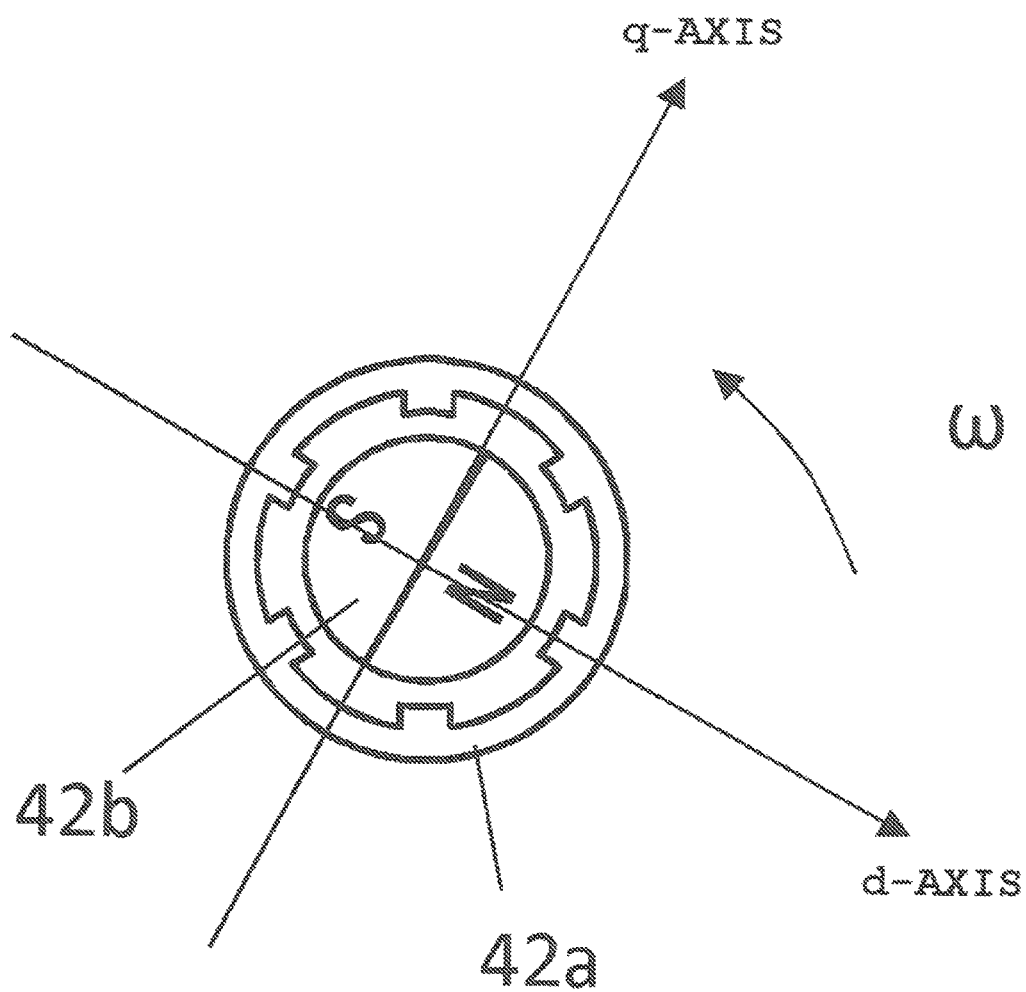
FIG. 9 is a view for describing the directions of a d-axis and a q-axis.

The speed controller 421 is configured to perform PI control (proportional control and integral control) or P control (proportional control) based on a difference between an input target rotational speed ωi and the estimated current rotational speed ω to output a current command I. An Id/Iq setter 422 is configured to set a current command Id, Iq in a dq rotating coordinate system based on the current command I. As illustrated in FIG. 9, a d-axis in the dq rotating coordinate system is the coordinate axis taking the N-pole of the rotating motor rotor 42b as a forward direction. In addition, a q-axis is the coordinate axis perpendicular to the d-axis at 90 deg advance, and the direction of the q-axis is a reverse voltage direction.

The equivalent circuit voltage converter 423 is configured to convert the current command Id, Iq into a voltage command Vd, Vq in the dq rotating coordinate system, using Expression (9) based on the rotational speed ω calculated in rotational speed/magnetic pole position estimator 407 and the electrical equivalent circuit constant of the motor 42. In Expression (9), "L" and "r" denote motor winding inductance and resistance, and "ke" denotes the constant of reverse voltage induced by the motor itself.

[Formula 1]

$$\begin{pmatrix} Vd \\ Vq \end{pmatrix} = \begin{pmatrix} r & -\omega L \\ \omega L & r \end{pmatrix} \begin{pmatrix} Id \\ Iq \end{pmatrix} + \begin{pmatrix} 0 \\ \omega Ke \end{pmatrix} \quad (9)$$

The dq-to-two-phase voltage converter 424 is configured to convert the voltage command Vd, Vq in the dq rotating coordinate system into a voltage command Vα, Vβ, in an αβ fixed coordinate system based on the converted voltage command Vd, Vq and the electrical angle θ input from the rotational speed/magnetic pole position estimator 427. A two-phase-to-three-phase voltage converter 425 is configured to convert the two-phase voltage command Vα, Vβ into a three-phase voltage command Vu, Vv, Vw. A PWM signal generator 426 is configured to generate, based on the three-phase voltage command Vu, Vv, Vw, a PWM control signal for turning on/off (conduction or blocking) the switching element provided at the inverter 46. The inverter 46 is configured to turn on/off the switching element based on the PWM control signal input from the PWM signal generator 426 to apply drive voltage to the motor 42.

Figure 10:
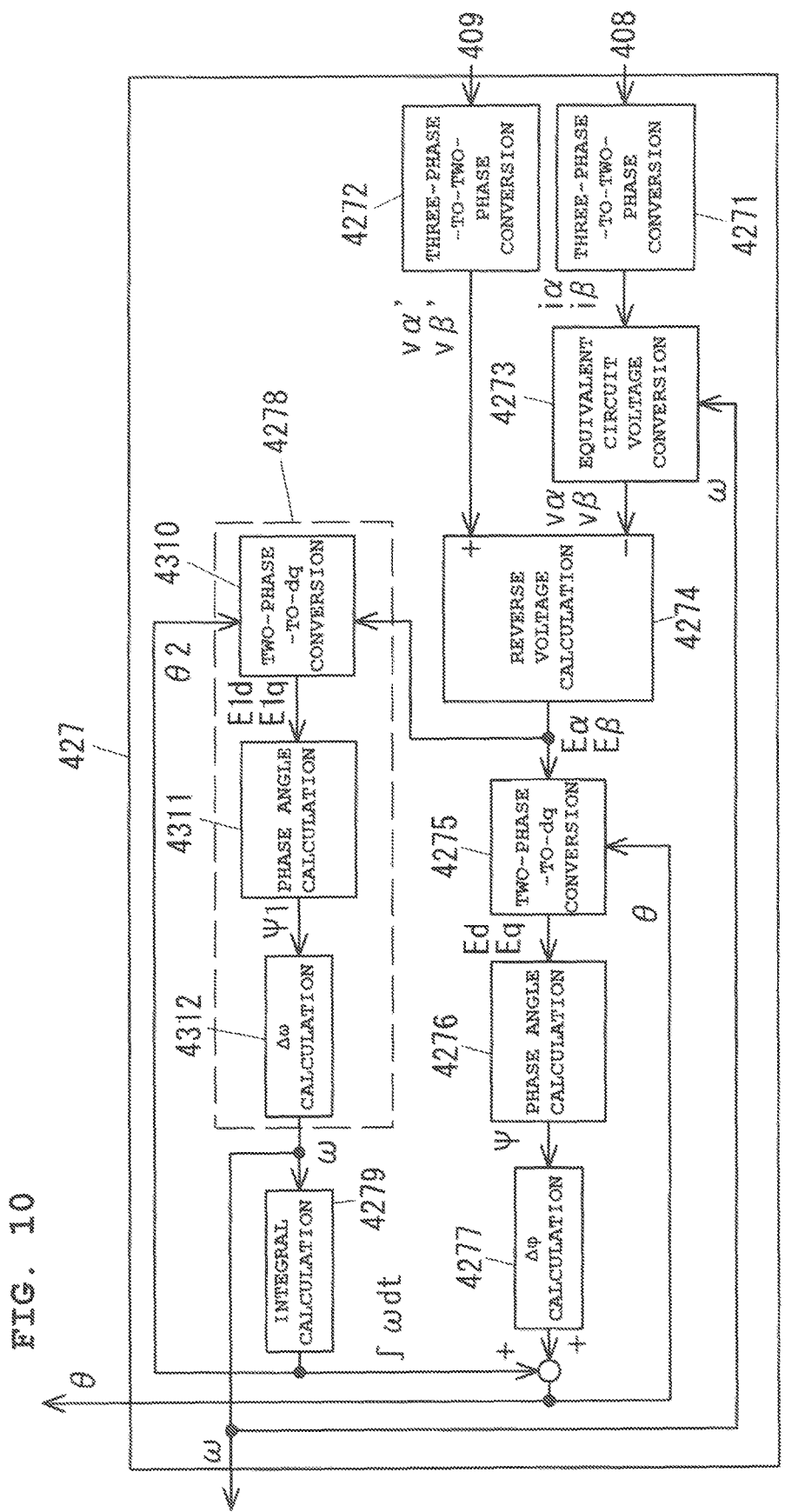
FIG. 10 is a block diagram of an example of a rotational speed/magnetic pole position estimator.

FIG. 10 is a block diagram of an example of the rotational speed/magnetic pole position estimator 427. A phase voltage detection signal vv, vu, vw output from the voltage detector 51 is input to a three-phase-to-two-phase converter 4272 via the low-pass filter 409. The three-phase-to-two-phase converter 4272 is configured to convert the three-phase voltage signal into a two-phase voltage signal vα', vβ'. The converted voltage signal vα', vβ' is input to a reverse voltage calculator 4274.

Meanwhile, a phase current detection signal iv, iu, iw output from the current detector 50 is input to a three-phase-to-two-phase converter 4271 via the low-pass filter 408. The three-phase-to-two-phase converter 4271 is configured to convert the three-phase current detection signal iv, iu, iw into a two-phase current signal iα, iβ. The converted current signal iα, iβ is input to an equivalent circuit voltage converter 4273.

The equivalent circuit voltage converter 4273 is configured to use Expression (10) based on the electrical equivalent circuit constant of the motor 42 to convert the current signal iα, iβ into a voltage signal vα, vβ. The converted voltage signal vα, vβ is input to the reverse voltage calculator 4274. Note that an equivalent circuit is divided into a resistance component r and an inductance component L of a motor coil. Values of r and L are obtained from, e.g., motor specifications, and are stored in a storage (not shown) in advance.

[Formula 2]

$$\begin{pmatrix} v\alpha \\ v\beta \end{pmatrix} = \begin{pmatrix} r & -\omega L \\ \omega L & r \end{pmatrix} \begin{pmatrix} i\alpha \\ i\beta \end{pmatrix} \quad (10)$$

The reverse voltage calculator 4274 is configured to calculate, using Expression (11), a reverse voltage Eα, Eβ based on the voltage signal vα', vβ' generated based on the motor three-phase voltage and the voltage signal vα, vβ generated based on the motor three-phase current.

[Formula 3]

$$\begin{pmatrix} E\alpha \\ E\beta \end{pmatrix} = \begin{pmatrix} v\alpha' \\ v\beta' \end{pmatrix} - \begin{pmatrix} v\alpha \\ v\beta \end{pmatrix} \quad (11)$$

The rotational speed of the motor rotor 42b does not rapidly change within a single rotation cycle due to rotor rotation inertia, but gradually changes at least across several cycles. This can be taken as quasi-stationary response. Thus, a two-phase-to-dq voltage converter 4275 is configured to convert the reverse voltage (Eα, Eβ) input by conversion represented by Expression (12) into a reverse voltage (Ed, Eq) in the dq rotating coordinate system. Note that the electrical angle θ calculated at previous calculation timing in calculation performed at predetermined time intervals is fed back to θ in Expression (12).

[Formula 4]

$$\begin{pmatrix} Ed \\ Eq \end{pmatrix} = \begin{pmatrix} \cos\theta & \sin\theta \\ -\sin\theta & \cos\theta \end{pmatrix} \begin{pmatrix} E\alpha \\ E\beta \end{pmatrix} \quad (12)$$

Figure 11:
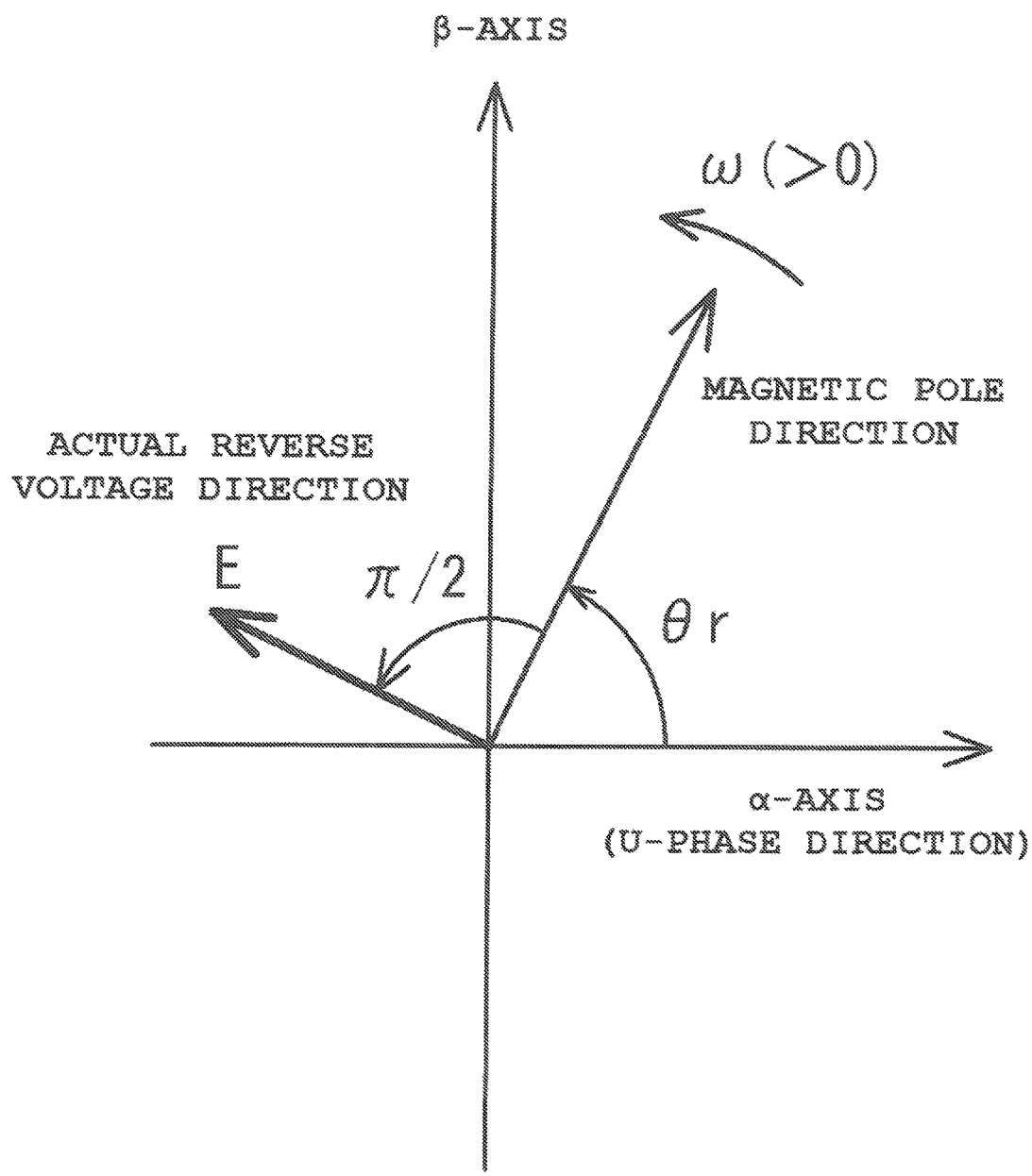
FIG. 11 is a graph of a reverse voltage and an electrical angle θr in an αβ fixed coordinate system.

Coordinate conversion will be considered as follows using complex notation. When ω>0, the α component Eα and the β component Eβ of the reverse voltage (Eα, Eβ) correspond respectively to a real part and an imaginary part of E×exp(j(θr+π/2)), where "E" denotes the magnitude of reverse voltage and "θr" denotes an actual electrical angle. FIG. 11 is a graph of the reverse voltage and the electrical angle θr in the αβ fixed coordinate system. Since the reverse voltage direction is a 90-degree (π/2 rad) forward direction with respect to the electrical angle θr, the electrical angle θr is represented by θr=a tan(−Eα/Eβ). The reverse voltage direction and a magnetic pole direction rotate at the rotational speed ω.

Figure 12:
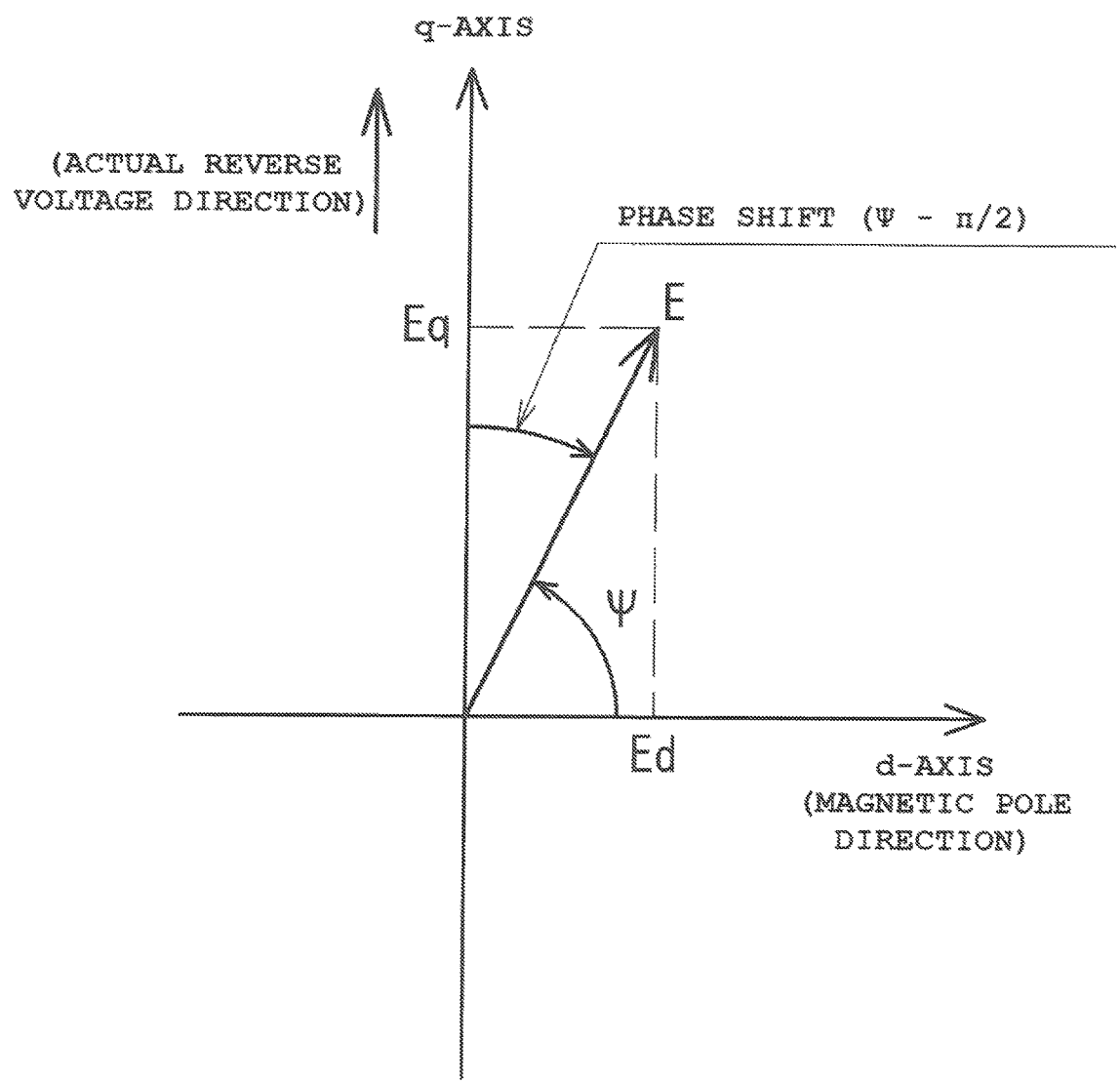
FIG. 12 is a graph for describing phase error in a dq rotating coordinate system.

Two-phase-to-dq coordinate conversion to which the estimated magnetic pole electrical angle θ is applied is represented by multiplication of E×exp(j(θr+π/2)) by exp(-jθ). Thus, the reverse voltage (Ed, Eq) in the dq rotating coordinate system is represented by E×exp(j(θr+π/2-θ)). FIG. 12 is a graph for describing phase error in the dq rotating coordinate system, and the magnetic pole direction is coincident with the d-axis. A phase Ψ is represented by Ψ=θr+π/2-θ, and is calculated by Ψ=a tan(Eq/Ed). A phase angle calculator 4276 of FIG. 10 is configured to calculate, using Ψ=a tan(Eq/Ed), the phase angle Ψ of the reverse voltage (Ed, Eq) in the dq rotating coordinate system.

When the estimated magnetic pole electrical angle θ is coincident with the actual magnetic pole electrical angle θr, Ψ=π/2. Thus, the reverse voltage direction is coincident with the q-axis. On the other hand, θr≠θ leads to θr-θ=Ψ-π/2 as phase error as shown in FIG. 12. Since Ψ-π/2<0 in FIG. 12, θr<θ. The estimated magnetic pole electrical angle θ is estimated as being greater (having an advanced phase) than the actual magnetic pole electrical angle θr. In such a manner that Ψ calculated using Ψ=a tan(Eq/Ed) is controlled to be (Ψ-π/2)→0, the estimated magnetic pole electrical angle θ can converge to the actual magnetic pole electrical angle θr.

A correction amount Δφ calculator 4277 is configured to calculate a magnetic pole phase error correction amount Δφ for correcting the above-described magnetic pole phase error. The magnetic pole phase error correction amount Δφ is, as shown in Expression (13), obtained by multiplication by a suitable gain g1 (a gain in proportional control or a gain in proportional/integral control) based on a value (the degree of positive/negative change) of Ψ-π/2 (rad). According to Expression (13), when Ψ-π/2<0 (θr<θ) as shown in FIG. 12, Δφ<0. That is, the electrical angle θ of which phase is advanced with respect to the actual electrical angle θr is shifted to the negative side.

$$\Delta\varphi = g1 \times (\Psi - \pi/2): \text{ in the case of } \Psi - \pi/2 \neq 0$$

$$\Delta\varphi = 0: \text{ in the case of } \Psi - \pi/2 = 0 \quad (13)$$

Independently of calculation of the magnetic pole phase error correction amount Δφ as described above, estimation calculation of the rotational speed ω is performed in a rotational speed calculator 4278. Then, an integrated value ∫ωdt of the rotational speed ω is calculated in an integral calculator 4279.

A two-phase-to-dq voltage converter 4310 of the rotational speed calculator 4278 is configured to calculate, using Expression (14), a reverse voltage (E1d, E1q) in the dq rotating coordinate system based on the reverse voltage (Eα, Eβ) input from the reverse voltage calculator 4274 and the integrated value θ2 output from the integral calculator 4279. Unlike the electrical angle θ used in the two-phase-to-dq voltage converter 4275, the integrated value (the electrical angle) θ2 used herein is an electrical angle in the state in which magnetic pole phase error is not corrected by the magnetic pole phase error correction amount Δφ.

[Formula 5]

$$\begin{pmatrix} E1d \\ E1q \end{pmatrix} = \begin{pmatrix} \cos\theta 2 & \sin\theta 2 \\ -\sin\theta 2 & \cos\theta 2 \end{pmatrix} \begin{pmatrix} E\alpha \\ E\beta \end{pmatrix} \quad (14)$$

Then, a phase angle calculator 4311 is configured to calculate a phase angle Ψ1 by Expression (15). In the αβ fixed coordinate system, the reverse voltage vector (Eα, Eβ) rotates at the rotational speed ω. When the actual electrical angle θr and the estimated electrical angle θ have the same periodicity, the rotational speed ω estimated in the dq rotating coordinate system converges, even with phase error, to the actual rotational speed ωr. As a result, the phase Ψ1 of the reverse voltage (E1d, E1q) subjected to two-phase-to-dq voltage conversion is a fixed value. Conversely, without convergence, the phase Ψ1 varies.

[Formula 6]

$$\Psi 1 = \tan^{-1}(E1q/E1d) \quad (15)$$

A rotational speed error corrector 4312 is configured to calculate a correction amount Δω (=ω (succeeding value)-ω (current value)) for correcting a rotational speed error based on a change ΔΨ1 in the phase Ψ1. The correction amount Δω is, as shown in Expression (16), obtained by multiplication by a suitable gain g2 (a gain in proportional control or a gain in proportional/integral control) based on a value (the degree of positive/negative change) of ΔΨ1. The change in the phase Ψ1 is proportional to the rotational speed error (ωr-ω). Thus, when ωr>ω, ΔΨ1>0. The correction amount Δω acts to increase the rotational speed.

$$\Delta\omega = g2 \times \Delta\Psi 1: \text{ in the case of } \Delta\Psi 1 \neq 0$$

$$\Delta\omega = 0: \text{ in the case of } \Delta\Psi 1 = 0 \quad (16)$$

Further, the rotational speed error corrector 4312 calculates the rotational speed ω (the succeeding value) at succeeding timing in such a manner that the calculated correction amount Δω is added to the current rotational speed ω (the current value) (Expression (17)). Using Expression (17), correction is successively made at every sampling cycle so that convergence to the actual rotational speed ωr can be made. Since such a convergence process is the control of making a steady-state error (an offset) to zero, the steady-state error as a typical problem can be reduced to the minimum extent.

$$\omega(\text{Succeeding Value}) = \omega(\text{Current Value}) + \Delta\omega \quad (17)$$

The integral calculator 4279 calculates the integrated value ∫ωdt based on the rotational speed ω output from the rotational speed error corrector 4312. The integrated value ∫ωdt is added to the magnetic pole phase error correction amount Δφ calculated in the correction amount Δφ calculator 4277, and as a result, a magnetic pole electrical angle (a succeeding value) θ is obtained. Moreover, the integrated value ∫ωdt is, as the electrical angle θ2, fed back to the two-phase-to-dq voltage converter 4310.

As described above, the rotational speed ω calculated by the rotational speed calculator 4278 is input to the integral calculator 4279 and the equivalent circuit voltage converter 4273, and is output from the rotational speed/magnetic pole position estimator 427. Further, the electrical angle θ obtained by addition of the integrated value ∫ωdt to the magnetic pole phase error correction amount Δφ is fed back to the two-phase-to-dq voltage converter 4275, and is output from the rotational speed/magnetic pole position estimator 427.

Two-phase-to-dq processing (the two-phase-to-dq voltage converters 4275, 4310) in the rotational speed/magnetic pole position estimator 427 is a type of oversampling signal processing on the premise of quasi-stationary response. In motor control, a majority part of the input signal in the two-phase-to-dq processing contains the rotational component, low-pass filtering for removing a noise component other than the rotational component is not necessarily required right after the two-phase-to-dq processing. However if the low-pass filtering is provided, this leads to (a) an increase in the bit number of the ω signal and (b) an increase in a phase-error bit number. Thus, the bit number of sin (ωt) can be increased, and a phase error can be reduced.

(Corrected Electrical Angle θ1)

The rotational speed ω output from the rotational speed/magnetic pole position estimator 427 of the sinusoidal drive controller 420 is input to a phase corrector 418 illustrated in FIG. 7, and the electrical angle θ is input to the phase corrector 418 and a harmonic electrical angle generator 419. As described above, in the signal xs, ys input from the displacement sensor to the vibration compensator 416, phase shift is caused due to the influence of the bandpass filter 502. Moreover, phase shift is also caused due to the transfer function Gcont.

Thus, in the third conversion processor 603 of FIG. 7, the corrected electrical angle θ1 corrected based on the above-described phase shift is used as the electrical angle θ input from the motor drive controller 2a. The corrected electrical angle θ1 is generated at the phase corrector 418 provided at the bearing drive controller 2b. For example, if phase shift is phase delay, the corrected electrical angle θ1 is, according to Expression (18), calculated using the input electrical angle θ and a phase lead φ(ω) based on the phase shift.

$$\theta 1 = \theta + \varphi(\omega) \tag{18}$$

Figure 13:
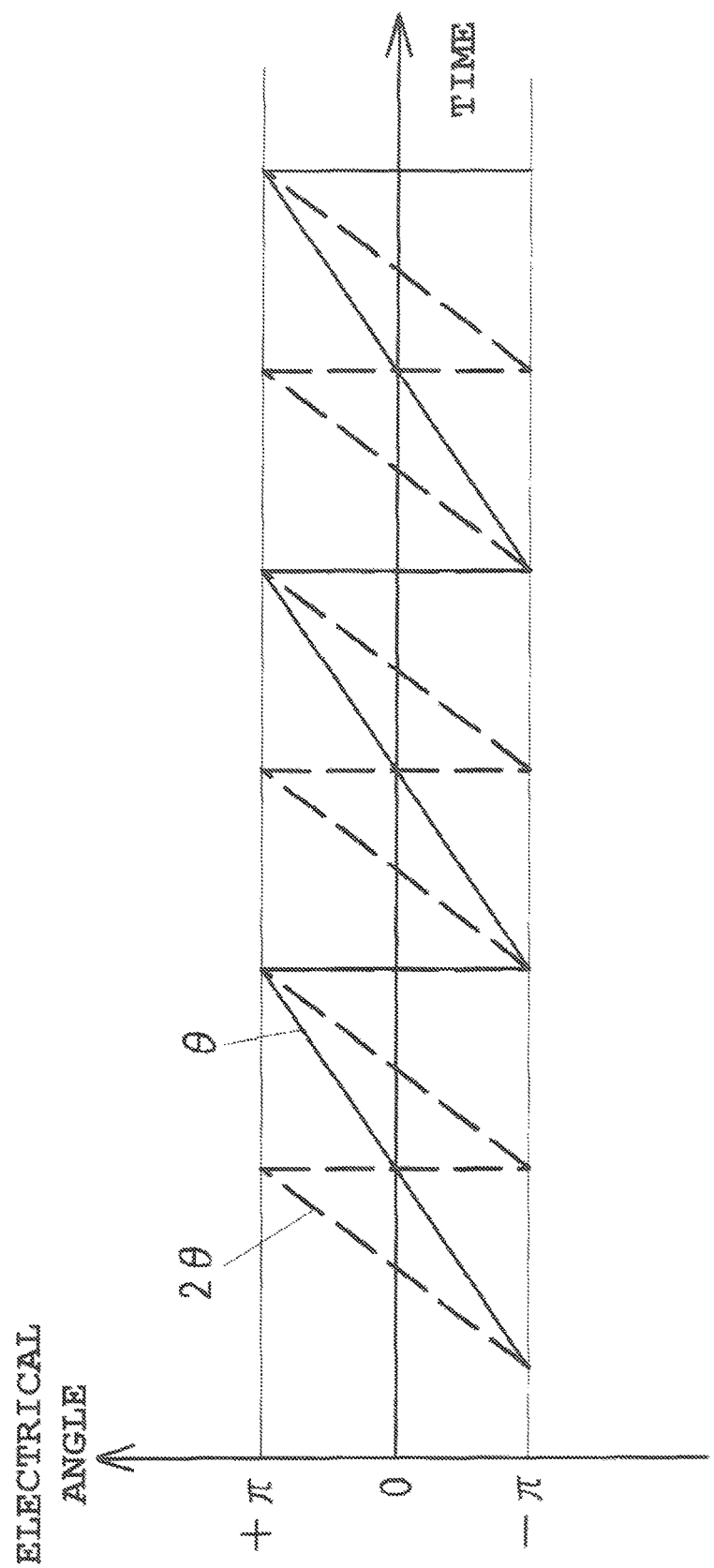
FIG. 13 is a graph for describing generation of a second harmonic electrical angle 2θ (n=2) from the electrical angle θ.

In the harmonic electrical angle generator 419 of FIG. 7, a harmonic electrical angle nθ is generated based on the electrical angle θ input from a motor control side. FIG. 13 is a graph for describing generation of a second harmonic electrical angle 2θ (n=2) from the electrical angle θ. In this case, 2θ=2× θ is calculated for the electrical angle θ at every calculation cycle. When the obtained value reaches +π, the electrical angle 2θ is shifted back to −π such that a value domain is within ±n. The same applies to the case where n is a value other than 2.

Note that in calculation of the electrical angle θ (=∫ωdt+ Δφ) in the rotational speed/magnetic pole position estimator 427 of the sinusoidal drive controller 420, when an output with an error of not exceeding 1 deg is obtained at a single rotation cycle T, a short sampling cycle of equal to or less than T/360 is required. A dual high-frequency requires a sampling cycle of equal to or less than T/720, and a higher-order frequency results in a shorter required sampling cycle.

Second Embodiment

Figure 14:
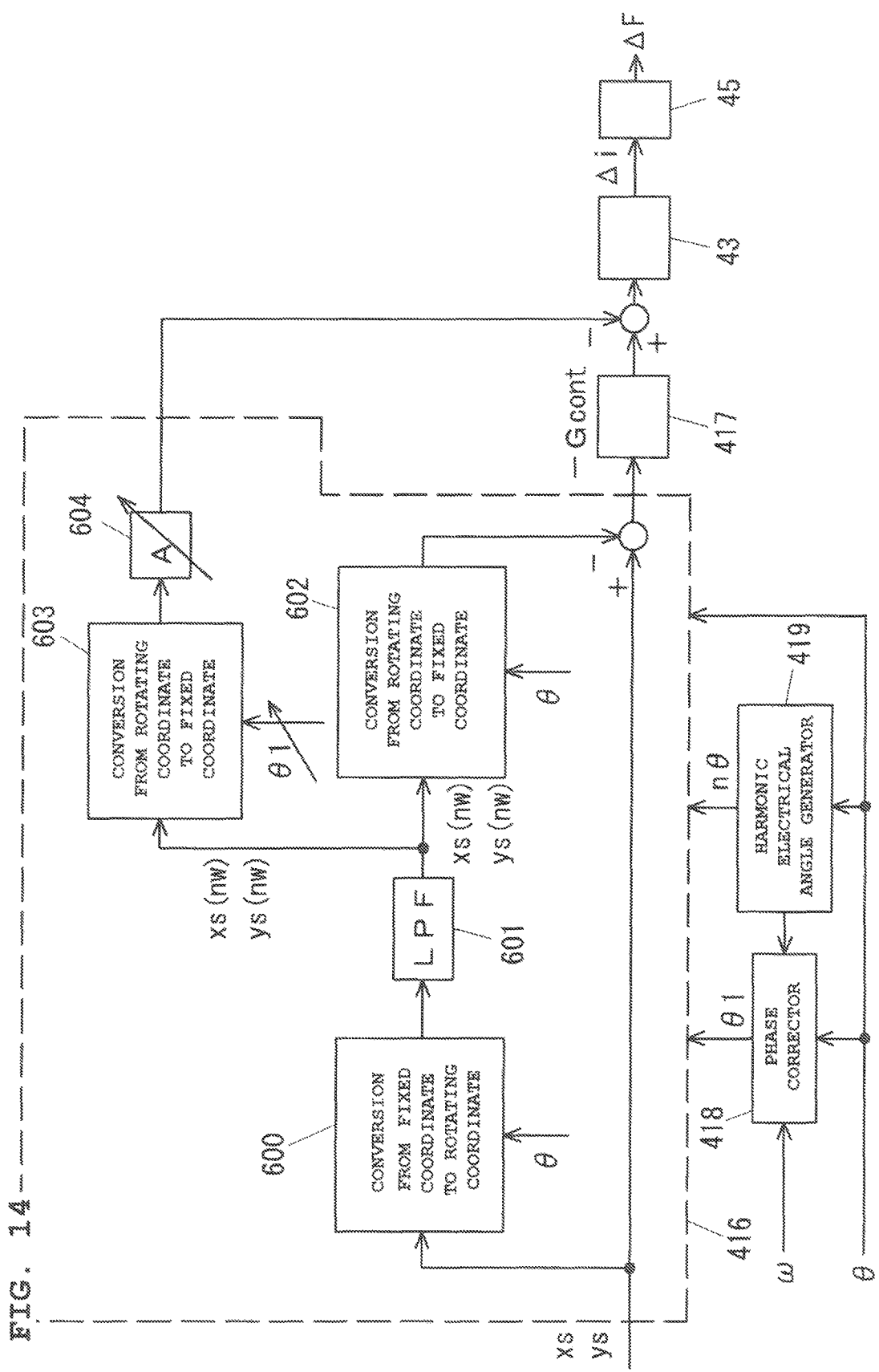
FIG. 14 is a diagram for describing a second embodiment of the present invention.

FIG. 14 is a diagram of a second embodiment of the present invention. FIG. 14 corresponds to FIG. 5 of the first embodiment described above. In the above-described first embodiment, the signal output from the compensator 604 of the vibration compensator 416 is added to the sensor signal xs, ys prior to the magnetic levitation controller 417. On the other hand, in the second embodiment, the signal output from a compensator 604 is subtracted from the signal output from a magnetic levitation controller 417.

Thus, a post-compensation change ΔF'(nw) in electromagnetic force in the second embodiment is obtained according to Expression (19).

$$\Delta F'(nw)=(4kI/D^2)[(-\text{Gcont}(nw))\{\Delta ds(nw)-\Delta ds(nw)\}- A\Delta ds'(nw))]+(4kI^2/D^3)\Delta dr(nw)=(4kI/D^2)[-A\Delta ds'(nw)]+(4kI^2/D^3)\Delta dr(nw) \tag{19}$$

In order to obtain a post-compensation change ΔF'(nw) of ΔF'(nw)=0 in Expression (19), the phase shift caused in a bandpass filter 502 is first corrected by an electrical angle θ1 of which phase is corrected. The electrical angle θ1 is similarly represented by Expression (18) as described above. When a gain in current conversion of an excitation amplifier is one, a correction factor A is set at A=I/D.

According to the above-described embodiments, the following features and advantageous effects are obtained.

(1) The magnetic bearing device includes the magnetic bearings 67, 68, 69 configured to magnetically levitate and support the rotor unit R rotatably driven by the sensor-less motor 42; the displacement sensors 49 as the detector configured to detect the displacement from the levitation target position of the rotor unit R to output the displacement signal Δds; the vibration compensator 416 as the signal processor configured to compensate, based on the motor rotation information (the electrical angle θ and the rotational speed ω) from the sinusoidal drive controller 420 as the motor controller of the motor 42, for the displacement signal Δds to reduce the vibration component of the electromagnetic force of the magnetic bearings 67, 68, 69; and the magnetic levitation controller 417 and the excitation amplifier 43 as the current controller configured to generate the control current of the magnetic bearings 67, 68, 69 based on the displacement signal having been processed in the vibration compensator 416.

Generally, in the motor controller of the sensor-less motor, the circuit configured to generate the motor rotation information (the electrical angle θ and the rotational speed ω) required for motor control is provided. In the above-described embodiments, the electrical angle θ and the rotational speed ω are generated in the rotational speed/magnetic pole position estimator 427 of the sinusoidal drive controller 420 illustrated in FIG. 8. With whirling of the rotor shaft 5, a vibration component (a rotational vibration component) of a frequency equivalent to the electrical angle θ or an integer multiple nθ thereof is contained in the actual displacement Δdr of the rotor and the displacement signal Δds of the displacement sensor 49. As a result, the rotational vibration component is generated in electromagnetic force, and therefore, generates pump vibration.

In the above-described embodiments, the motor rotation information (the electrical angle θ and the rotational speed ω) is obtained from the sinusoidal drive controller 420, and the compensation processing is performed for the displacement signal Δds based on the motor rotation information. In this manner, the vibration component of the electromagnetic force is reduced. Since the motor rotation information of the motor drive controller 2a is used as described above, a rotation detection device configured to generate the electrical angle θ and the rotational speed ω is not necessarily provided at the bearing drive controller 2b. This can reduce a cost. Moreover, since the obtained motor rotation information (θ, ω) is the rotation information generated for motor drive current generation, the rotation information accurately indicate rotor whirling vibration. Thus, pump vibration can be effectively reduced.

(2) The following compensation processing by the vibration compensator 416 is preferred: as illustrated in, e.g., FIG. 7, the processing of generating the signal component (−Δds (nw)) canceling the rotational component Δds(nw) of the displacement signal Δds in the first signal processor (the processing line including the first conversion processor 600, the low-pass filter 601, and the second conversion processor 602) (the first compensation processing), generating the signal component (+AΔds'(nw)) generating the electromagnetic force canceling the electromagnetic force caused due to the actual displacement Δdr in the second signal processor (the processing line including the first conversion processor 600, the low-pass filter 601, the third conversion processor 603, and the compensator 604) (the second compensation processing), and adding these signal components to the displacement signal Δds. The vibration component depending on the control current Δi is efficiently removed by the first compensation processing, and the vibration component depending on the rotor displacement Δdr is efficiently removed by the second compensation processing.

(3) In the third conversion processor 603 of the second signal processor, the phase shift caused in the rotational component Δds(nw) of the displacement signal Δds after output from each displacement sensor 49 until generation of the control current Δi by the magnetic levitation controller 417 and each excitation amplifier 43 is corrected based on the motor rotation information (the electrical angle θ and the rotational speed ω), and the gain in the magnetic levitation controller 417 and each excitation amplifier 43 is corrected. In this manner, the signal component (+AΔds'(nw)) is generated. With the above-described phase shift and gain correction, the vibration component can be removed with a high accuracy.

(4) As illustrated in, e.g., FIG. 14, the magnetic levitation controller 417 may generate the current control signal based on the signal obtained by addition of the signal component (−Δds(nw)) generated in the first signal processor (the processing line including the first conversion processor 600, the low-pass filter 601, and the second conversion processor 602) to the displacement signal Δds, and each excitation amplifier 43 may generate the control current Δi based on the signal obtained by addition of the signal component (−AΔds'(nw)) generated in the second signal processor (the processing line including the first conversion processor 600, the low-pass filter 601, the third conversion processor 603, and the compensator 604) to the current control signal generated in the magnetic levitation controller 417.

(5) As illustrated in FIG. 7, the control current Δi may be generated based on the signal obtained by addition of the signal components (−Δds(nw), +AΔds'(nw)) generated in the first and second processors, respectively, to the displacement signal Δds.

(6) The rotor rotary-drive apparatus includes the magnetic bearing device described above, the sensor-less motor 42 configured to rotatably drive the rotor unit R as the rotor, the sinusoidal drive controller 420, and the magnetic levitation controller 417, the controllers 420, 417 being configured to control the sensor-less motor 42. In the rotor rotary-drive apparatus, the sinusoidal drive controller 420 and the magnetic levitation controller 417 are mounted on the field programmable gate array (FPGA) circuit. As a result, motor control and magnetic bearing control are digitalized, and vibration with the rotational component is removed by digital signal processing. This leads to easy handling and easy high-speed processing using the FPGA. Thus, in levitation control for all of the five axes of the magnetic bearings 67, 68, 69, the compensation processing can be, for each axis, performed not only for a basic component (N=1) but also for a plurality of harmonic components (N is equal to or greater than two), if necessary.

Various embodiments and variations have been described above, but the present invention is not limited to the contents of these embodiments and variations. Other embodiments conceivable within the technical idea of the present invention are included in the scope of the present invention. For example, the present invention is not limited to the above-described turbo-molecular pump, and is applicable to various rotor rotary-drive apparatuses. The present invention is applicable to self-sensing type that electromagnet is the displacement sensor.

What is claimed is:

1. A magnetic bearing device comprising:
   a magnetic bearing magnetically levitating and supporting a rotor rotatably driven by a sensor-less motor;
   a detector detecting displacement from a levitation target position of the rotor to output a displacement signal;
   a signal processor compensating, based on motor rotation information from a motor controller of the sensor-less motor, for the displacement signal to reduce a vibration component of electromagnetic force of the magnetic bearing; and
   a current controller generating control current of the magnetic bearing based on the displacement signal having been processed in the signal processor, wherein
   the signal processor includes:
   a first signal processor generating a signal component cancelling a rotational component of the displacement signal, based on the motor rotation information; and
   a second signal processor generating a signal component generating electromagnetic force canceling electromagnetic force caused due to the rotational component of the displacement, based on the motor rotation information, wherein
   the vibration component of electromagnetic force is expressed by Expression $\Delta F=(4kI/D^2)(-G\text{cont})\Delta ds+(4kI^2/D^3)\Delta dr;$ the control current is controlled such that the first and second terms of the Expression are cancelled by each other,
   in the Expression, "D" denotes a gap dimension when a rotor shaft is magnetically levitated to a levitation target position, "I" denotes a bias current flowing through an magnetic bearing electromagnet, "Gcont" denotes a transfer function in magnetic levitation control, "Δds" denotes displacement signal, "Δdr" denotes actual displacement and "k" denotes a coefficient of the magnetic bearing electromagnet.

2. The magnetic bearing device according to claim 1, wherein
   the second signal processor generates the signal component by
   correcting, based on the motor rotation information, phase shift caused in the rotational component of the displacement signal after passage through the detector until control current generation by the current controller, and
   correcting a gain in the current controller.

3. The magnetic bearing device according to claim 1, wherein
   the current controller includes
   a magnetic levitation controller configured to generate a current control signal, and
   an excitation amplifier configured to generate the control current,
   the magnetic levitation controller generates the current control signal based on a signal obtained by addition of the signal component generated in the first signal processor to the displacement signal, and
   the excitation amplifier generates the control current based on a signal obtained by addition of the signal component generated in the second signal processor to the current control signal generated in the magnetic levitation controller.

4. A rotor rotary-drive apparatus comprising:
the magnetic bearing device according to claim 3;
a sensor-less motor configured to rotatably drive a rotor magnetically levitated and supported by the magnetic bearing device;
a motor controller configured to control the sensor-less motor; and
a field programmable gate array circuit, referred to as an FPGA circuit, on which at least the motor controller and the signal processor of the magnetic bearing device are mounted.

5. The magnetic bearing device according to claim 1, wherein
the current controller generates the control current based on a signal obtained by addition of the signal components generated in the first and second processors to the displacement signal.

6. The magnetic bearing device according to claim 1, wherein
the first signal processor includes;
a first conversion processor, converting a signal from a fixed coordinate system into a rotating coordinate system rotating at an electrical angle θ from the motor controller,
a low-pass filter, low-pass filtering for the signal output from the first conversion processor, and
a second conversion processor, converting the signal output from the low-pass filter from the rotating coordinate system into the fixed coordinate system, using an electrical angle θ from the motor controller, so that the signal only with the rotational component of the signal is generated.

7. A magnetic bearing device comprising:
a magnetic bearing magnetically levitating and supporting a rotor rotatably driven by a sensor-less motor;
a detector detecting displacement from a levitation target position of the rotor to output a displacement signal;
a signal processor compensating, based on motor rotation information from a motor controller of the sensor-less motor, for the displacement signal to reduce a vibration component of electromagnetic force of the magnetic bearing; and
a current controller generating control current of the magnetic bearing based on the displacement signal having been processed in the signal processor, wherein
the signal processor includes:
a first signal processor generating a signal component cancelling a rotational component of the displacement signal, based on the motor rotation information; and
a second signal processor generating a signal component generating electromagnetic force canceling electromagnetic force caused due to the rotational component of the displacement, based on the motor rotation information,
the first signal processor includes:
a first conversion processor, converting a signal from a fixed coordinate system into a rotating coordinate system rotating at an electrical angle θ from the motor controller,
a low-pass filter, low-pass filtering for the signal output from the first conversion processor, and
a second conversion processor, converting the signal output from the low-pass filter from the rotating coordinate system into the fixed coordinate system, using an electrical angle θ from the motor controller, so that the signal only with the rotational component of the signal is generated, and
wherein
the second signal processor includes;
the first conversion processor,
the low-pass filter,
a third conversion processor, converting the signal output from the low-pass filter from the rotating coordinate system into the fixed coordinate system, using the electrical angle from the motor controller, electrical angle whose phase shift is corrected and,
a compensator correcting an amplitude of signal output from the third conversion processor using a correction factor.

* * * * *